US 9,600,129 B2

(12) United States Patent
Mizuhashi et al.

(10) Patent No.: US 9,600,129 B2
(45) Date of Patent: Mar. 21, 2017

(54) DISPLAY DEVICE

(71) Applicant: Japan Display Inc., Minato-ku (JP)

(72) Inventors: Hiroshi Mizuhashi, Minato-ku (JP);
Yoshitoshi Kida, Minato-ku (JP);
Makoto Hayashi, Minato-ku (JP);
Hidetoshi Komatsu, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/585,818

(22) Filed: Dec. 30, 2014

(65) Prior Publication Data
US 2015/0234496 A1    Aug. 20, 2015

(30) Foreign Application Priority Data

Feb. 18, 2014  (JP) ................................. 2014-028572
Oct. 2, 2014   (JP) ................................. 2014-203638

(51) Int. Cl.
*G06F 3/044*    (2006.01)
*G09G 3/36*     (2006.01)

(52) U.S. Cl.
CPC .......... *G06F 3/044* (2013.01); *G09G 3/3688* (2013.01); *G09G 2300/0426* (2013.01); *G09G 2310/0297* (2013.01)

(58) Field of Classification Search
None
See application file for complete search history.

(56) References Cited

U.S. PATENT DOCUMENTS

2006/0109222 A1    5/2006  Lee et al.
2007/0273633 A1*  11/2007  Hashimoto .......... G09G 3/3655
                                              345/98
2010/0117980 A1    5/2010  Lee et al.
(Continued)

FOREIGN PATENT DOCUMENTS

CN    103309534 A    9/2013
JP    2007-65239     3/2007
(Continued)

OTHER PUBLICATIONS

Office Action issued Nov. 17, 2015 in Korean Patent Application No. 10-2015-0006618 (with English translation).
(Continued)

*Primary Examiner* — Claire X Pappas
*Assistant Examiner* — Benjamin Casarez
(74) *Attorney, Agent, or Firm* — Oblon, McClelland, Maier & Neustadt, L.L.P.

(57) ABSTRACT

According to one embodiment, a display device includes a plurality of first lines, a plurality of second lines, a plurality of switch elements, a plurality of pixel electrodes, a plurality of third lines, a display layer, and a controller. The plurality of first lines extend in a first direction. The plurality of second lines extend in a second direction. The plurality of third lines extend in the second direction. The switch elements are electrically connected to the first lines and the second lines. The pixel electrodes are connected to the switch elements. The display layer performs an optical operation based on an electrical signal applied to the pixel electrodes. The controller includes at least one switch connected between the second lines and the third lines.

14 Claims, 14 Drawing Sheets

(56) References Cited

U.S. PATENT DOCUMENTS

| | | | | |
|---|---|---|---|---|
| 2011/0050585 A1* | 3/2011 | Hotelling | | G06F 3/044 345/173 |
| 2013/0127752 A1* | 5/2013 | Takeuchi | | G02F 1/13338 345/173 |
| 2014/0118299 A1* | 5/2014 | Wang | | G06F 3/0416 345/174 |
| 2014/0132534 A1* | 5/2014 | Kim | | G06F 3/0412 345/173 |
| 2014/0354572 A1* | 12/2014 | Zhao | | G06F 3/0416 345/173 |
| 2014/0362026 A1* | 12/2014 | Chen | | G06F 3/044 345/174 |
| 2015/0185902 A1* | 7/2015 | Liu | | G06F 3/044 345/174 |
| 2015/0185941 A1* | 7/2015 | Lee | | G06F 3/0412 345/173 |
| 2016/0098126 A1* | 4/2016 | Lee | | G06F 3/044 345/174 |

FOREIGN PATENT DOCUMENTS

| | | |
|---|---|---|
| JP | 2012-230657 | 11/2012 |
| KR | 10-2006-0056633 | 5/2006 |
| TW | 201407453 A | 2/2014 |

OTHER PUBLICATIONS

Combined Taiwanese Office Action and Search Report issued Jul. 22, 2016 in Patent Application No. 104100334 (with English language translation).

Office Action issued Jun. 8, 2016 in Korean Patent Application No. 10-2015-0006618 (with English translation).

Office Action issued in Korean Application No. 10-2015-0006618 dated Oct. 30, 2016 with English Translation.

* cited by examiner

DISPLAY DEVICE

CROSS-REFERENCE TO RELATED APPLICATIONS

This application is based upon and claims the benefit of priority from Japanese Patent Application No. 2014-028572, filed on Feb. 18, 2014, and Japanese Patent Application No. 2014-203638, filed on Oct. 2, 2014; the entire contents of which are incorporated herein by reference.

FIELD

Embodiments described herein relate generally to a display device.

BACKGROUND

Display devices that use liquid crystals, organic EL, etc., are being developed. In addition to the display operation of the display device, there are cases where a non-display operation such as, for example, sensing a touch input or the like is performed. Thus, even when the non-display operation (e.g., the sensing of the input) or the like is performed, it is desirable to maintain a high-quality display.

SUMMARY

According to one embodiment, a display device includes a plurality of first lines, plurality of second lines, a plurality of switch elements, a plurality of pixel electrodes, a plurality of third lines, a display layer, and a controller. The plurality of first lines extend in a first direction to be arranged in a second direction intersecting the first direction. The plurality of second lines extend in the second direction to be arranged in the first direction. Each of the plurality of switch elements is electrically connected to one of the plurality of first lines and one of the plurality of second lines. The plurality of pixel electrodes are electrically connected respectively to the plurality of switch elements. The plurality of third lines extend in the second direction to be arranged in the first direction. The display layer performs an optical operation of at least one of a light emission or a change of an optical characteristic based on an electrical signal applied to the plurality of pixel electrodes. And The controller includes at least one switch connected between the second lines and the third lines.

DETAILED DESCRIPTION

Figure 1:
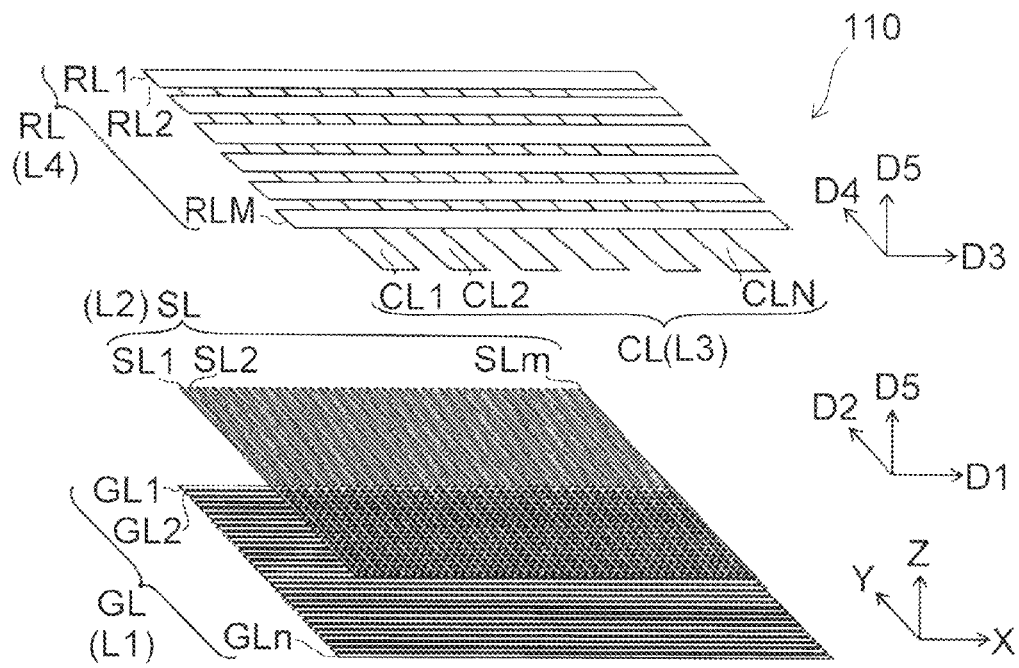
FIG. 1 is a schematic perspective view illustrating a display device according to a first embodiment.

Embodiments of the invention will now be described with reference to the drawings.

The disclosure is but an example; and appropriate modifications within the spirit of the invention will be readily apparent to one skilled in the art and naturally are within the scope of the invention. Moreover, although the widths, thicknesses, configurations, etc., of components in the drawings may be illustrated schematically compared to the actual embodiments for better clarification of description, these are merely examples and do not limit the construction of the invention.

Further, in the specification and the drawings, components similar to those described in regard to a drawing thereinabove are marked with like reference numerals, and a detailed description may be omitted as appropriate.

First Embodiment

FIG. 1 is a schematic perspective view illustrating a display device according to a first embodiment.

As illustrated in FIG. 1, the display device 110 according to the embodiment includes multiple first lines L1 (e.g., gate lines GL), multiple second lines L2 (e.g., signal lines SL), and multiple third lines L3 (e.g., common lines CL).

Each of the multiple first lines L1 extends in a first direction D1. The multiple first lines L1 are arranged in a second direction D2. The second direction D2 intersects the first direction D1. In the example, the second direction D2 is perpendicular to the first direction D1.

Each of the multiple second lines L2 extends in the second direction D2. The multiple second lines L2 are arranged in the first direction D1.

Each of the multiple third lines L3 extends in the second direction D2. The multiple third lines L3 are arranged in the first direction D1.

A plane that includes the first direction D1 and the second direction D2 is taken as an X-Y plane. A direction perpendicular to the X-Y plane is taken as a Z-axis direction. One direction in the X-Y plane is an X-axis direction. One direction in the X-Y plane is a Y-axis direction. The Y-axis direction is perpendicular to the X-axis direction. In the example, the first direction D1 is parallel to the X-axis direction. The second direction D2 is parallel to the Y-axis direction.

Multiple fourth lines (e.g., sense lines RL) are provided in the example. The multiple fourth lines L4 are separated from the first to third lines L1 to L3 in a direction (the Z-axis direction, i.e., a fifth direction D5) perpendicular to the X-Y plane. Each of the multiple fourth lines L4 extends in a third direction D3. The third direction D3 is parallel to the X-Y plane and intersects the second direction D2. The multiple fourth lines L4 are arranged in a fourth direction D4. The fourth direction is parallel to the X-Y plane and intersects the third direction D3. In the example, the third direction D3 is parallel to the X-axis direction; and the fourth direction D4 is parallel to the Y-axis direction.

The multiple gate lines GL include, for example, a first gate line GL1, a second gate line GL2, and an nth gate line GLn. The number of gate lines GL is n. n is an integer not less than 2. For example, n is 1920. In the embodiment, n is arbitrary.

The multiple signal lines SL include, for example, a first signal line SL1, a second signal line SL2, and an mth signal line SLm. The number of signal lines SL is m. m is an integer not less than 2. For example, m is 1080×3. In other words, for example, in the case where a set of a red pixel, a green pixel, and a blue pixel is used as one component, the number of components is 1080. The signal lines SL are provided to correspond to the number of multiple pixels arranged along the first direction. In the embodiment, m is arbitrary.

The multiple common lines CL include, for example, a first common line CL1, a second common line CL2, and an Nth common line CLN. The number of common lines CL is N. N is an integer not less than 2. In the embodiment, N is arbitrary.

The multiple sense lines RL include, for example, a first sense line RL1, a second sense line RL2, and an Mth sense line RLM. The number of sense lines RL is M. M is an integer not less than 2. In the embodiment, M is arbitrary.

In the example, the signal lines SL and the common lines CL are disposed between the gate lines GL and the sense lines RL. In the embodiment, various modifications of the dispositions (the dispositions in the fifth direction D5) of these lines are possible.

As described below, a display is performed using the multiple gate lines GL and the multiple signal lines SL. In the example, the multiple common lines CL and the multiple sense lines RL are used to perform, for example, input (e.g., touch input). In the embodiment, the sense lines RL may be omitted in the case where the input operation is not performed.

In the input operation, a touch sensing pulse signal for sensing the input is applied to the multiple common lines CL; and the sense lines RL receive the touch sensing pulse signal output from the common lines CL and output a touch sensing signal.

The contact or proximity of an object is sensed using the capacitance change between the common lines CL and the sense lines RL.

As long as the sense lines RL are disposed so that the capacitance is formed between the sense lines RL and the common lines CL, the sense lines RL may have any configuration or extension direction.

As illustrated in FIG. 1, the signal lines SL and the common lines CL extend to be parallel. Thereby, the apparent capacitance between the common lines CL and the signal lines SL can be eliminated. Therefore, the load of driving the common lines CL in the input operation can be reduced; and it is possible to increase the operation speed of the input operation and reduce the drive power.

As illustrated in FIG. 1, for example, the number of signal lines SL (i.e., m) is larger than the number of common lines CL (i.e., N). By setting the number of signal lines SL to be large, a high definition display can be implemented. On the other hand, there are many cases where the resolution of the input may be lower than the resolution of the display.

Therefore, the number of common lines CL can be smaller than the number of gate lines GL. By setting the number of common lines CL to be small, the time necessary for the sense operation can be shorter; and a display having no (low) incongruity becomes possible.

For example, the multiple signal lines SL are divided into multiple groups. For example, the multiple signal lines SL include first to kth groups, etc. Each of the multiple groups includes multiple mutually-adjacent signal lines SL. For example, the number of signal lines SL included in one group is j. j is an integer not less than 2.

For example, each of the groups of the multiple signal lines SL is overlapped by one common line CL (e.g., respectively by the multiple common lines CL) when projected onto the X-Y plane.

Figure 2:
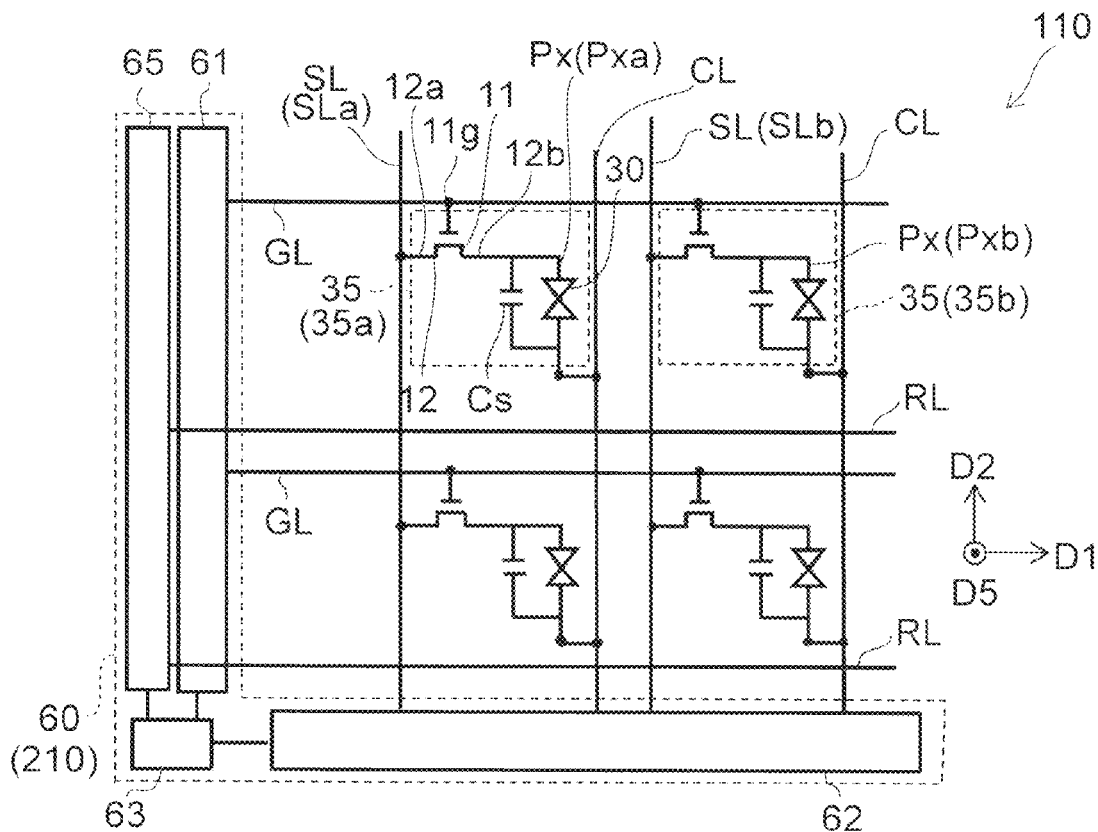
FIG. 2 is a schematic view illustrating the display device according to the first embodiment.

FIG. 2 is a schematic view illustrating the display device according to the first embodiment.

As illustrated in FIG. 2, multiple switch elements 11, multiple pixel electrodes Px, and a display layer 30 are provided in the display device 110. Each of the multiple switch elements 11 is electrically connected to one of the multiple first lines L1 (the gate lines GL) and one of the multiple second lines L2 (the signal lines SL).

In the embodiment, the state of being electrically connected includes the state in which two conductors are in direct contact and the state in which a current flows between two conductors that have another conductor inserted therebetween. Further, the state of being electrically connected includes the state in which it is possible to form a state in which a current flows between two conductors that have an element (e.g., a switch element or the like) inserted therebetween.

For example, the switch element 11 includes a gate 11g and a semiconductor layer 12. The semiconductor layer 12 includes a first portion 12a and a second portion 12b. The gate 11g is electrically connected to one of the multiple gate lines GL. The first portion 12a of the semiconductor layer 12 is electrically connected to one of the multiple signal lines SL.

The multiple pixel electrodes Px are electrically connected respectively to the multiple switch elements 11. For example, one pixel electrode Px is electrically connected to the second portion 12b of the semiconductor layer 12 of the switch element 11.

The display layer 30 performs an optical operation based on an electrical signal applied to the multiple pixel electrodes Px. The optical operation includes at least one of a light emission or a change of an optical characteristic. As described below, for example, the display layer 30 is provided between the multiple pixel electrodes Px and the multiple sense lines RL.

In the case where a liquid crystal layer is used as the display layer 30, the optical operation includes a change of an optical characteristic. The optical characteristic includes, for example, at least one of birefringence, optical rotatory properties, scattering properties, optical reflectance, or optical absorptance. For example, the liquid crystal alignment of the display layer 30 (the liquid crystal layer) changes due to the electrical signal applied to the pixel electrodes Px; and the effective birefringence changes. At least one of optical rotatory properties, scattering properties, optical reflectance, or optical absorptance may change.

For example, in the case where a light emitting layer (e.g., an organic light emitting layer) is used as the display layer 30, the optical operation includes light emission (the emission of light). In other words, the display layer 30 performs an optical operation of at least one of a light emission or a change of an optical characteristic.

The display layer 30 is used as, for example, a load capacitance. In the example, a storage capacitor Cs is provided in parallel with the display layer 30. The storage capacitor Cs may be provided as necessary and may be omitted.

Multiple pixels 35 are provided in the display device 110. At least one switch element 11 and at least one pixel electrode Px are provided in each of the multiple pixels 35. In other words, the multiple switch elements 11 are provided respectively in the multiple pixels 35. The multiple pixel electrodes Px are provided respectively in the multiple pixels 35.

As illustrated in FIG. 2, a controller 60 (a drive device 210) is provided in the display device 110.

For example, the controller 60 includes a first drive circuit 61, a second drive circuit 62, and a control circuit 63. The first drive circuit 61 is electrically connected to the multiple gate lines GL. The second drive circuit 62 is electrically connected to the multiple signal lines SL and the multiple common lines CL. The control circuit 63 is electrically connected to the first drive circuit 61 and the second drive circuit 62. The appropriate signal processing of the electrical signals (including the image signal) acquired by the control circuit 63 is performed. The electrical signals for which the signal processing is performed are supplied to the first drive circuit 61 and the second drive circuit 62.

As described below, the second drive circuit 62 includes a display drive integrated circuit 62a including a source circuit. The display drive integrated circuit 62a is, for example, a source driver. The display drive integrated circuit 62a is, for example, an LSI (Large Scale Integrated-circuit).

The optical operation of the display layer 30 (e.g., the liquid crystal layer) at the multiple pixels 35 is controlled by the gate lines GL, the signal lines SL, the switch elements 11, and the pixel electrodes Px. Thereby, the display is performed. In the display operation, for example, the common lines CL are utilized as counter electrodes of the pixel electrodes Px. In other words, the potential of each of the multiple pixel electrodes Px is controlled by the electrical signal being supplied to the pixel electrode Px via the switch element 11. The display is performed by the alignment of the liquid crystal changing due to the electric field generated by the pixel electrodes Px and the common lines CL.

For example, a touch sensor 65 that includes a sense circuit may be further provided in the controller 60. The touch sensor 65 is electrically connected to the sense lines RL. In the sense operation, for example, the capacitance that is formed between each of the multiple common lines CL and each of the multiple sense lines RL is sensed by the second drive circuit 62 and the touch sensor 65.

The touch sensor 65 may be a touch IC. The touch sensor 65 may be provided on another substrate, e.g., a flexible substrate. The touch sensor 65 can transmit, via the control circuit 63 to the second drive circuit 62, selection information of the drive electrodes driven when touch sensing.

For example, the touch input to the display device 110 is sensed by the multiple sense lines RL and the multiple common lines CL. In the sense operation, for example, an input member (e.g., an input pen, etc.), a finger of a viewer (a user) of the display device 110, etc., is in contact with or proximal to the display device 110. The electrical capacitance that is formed by the sense lines RL and the common lines CL changes due to the contact or proximity recited above. The touch input is sensed by sensing the change of the electrical capacitance. For example, electrostatic-capacitance type sensing is performed. The display device 110 is a display device that has, for example, an input function.

In the example, the common lines CL (the third lines L3) are used as counter electrodes for the sensing, i.e., drive electrodes to which the touch sensing pulse signal is applied, while being used as counter electrodes for the display.

As illustrated in FIG. 2, for example, the multiple pixels 35 include a first color pixel 35a and a second color pixel 35b. For example, the multiple pixel electrodes Px include a first color pixel electrode Pxa for a first color and a second color pixel electrode Pxb for a second color. The second color is different from the first color. The multiple signal lines SL include a first color line SLa and a second color line SLb. The first color line SLa is electrically connected to the first color pixel electrode Pxa via one of the multiple switch elements 11. The second color line SLb is electrically connected to the second color pixel electrode Pxb via one other of the multiple switch elements 11. Further, a third color pixel and a third pixel electrode may be provided. Accordingly, a third color line may be provided. Further, the pixels 35 having four or more colors may be provided. An example will now be described in which the pixels 35 having three colors are provided.

Figure 3:
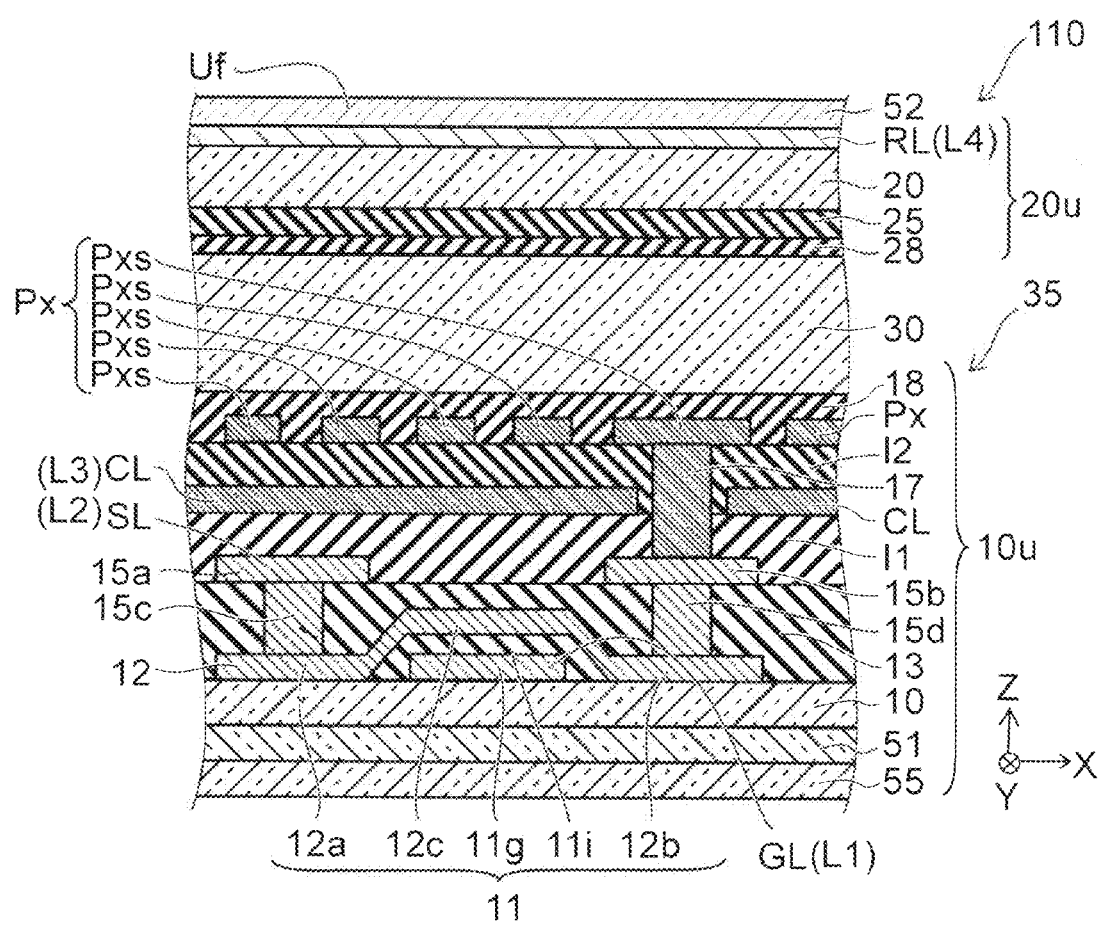
FIG. 3 is a schematic cross-sectional view illustrating the display device according to the first embodiment.

FIG. 3 is a schematic cross-sectional view illustrating the display device according to the first embodiment.

As illustrated in FIG. 3, a first substrate unit 10u, a second substrate unit 20u, and the display layer 30 are provided in the display device 110. The multiple pixels 35 are provided in the display device 110. FIG. 3 shows a portion of one pixel 35.

For example, a TFT (thin film transistor) array substrate is used as the first substrate unit 10u. For example, a first substrate 10, the gate lines GL (the first lines L1), the switch elements 11, the signal lines SL (the second lines L2), the common lines CL (the third lines L3), and the pixel electrodes Px are provided in the first substrate unit 10u.

For example, the gate lines GL and the signal lines SL extend in the X-Y plane. The first substrate unit 10u extends in the X-Y plane.

In the example, the first substrate 10 is light-transmissive. The first substrate 10 includes, for example, glass or a resin. The gate lines GL are provided on the first substrate 10.

In the example, a TFT is used as the switch element 11. The switch element 11 includes the semiconductor layer 12. The semiconductor layer 12 includes the first portion 12a, the second portion 12b, and a third portion 12c. The second portion 12b is separated from the first portion 12a in the X-Y plane. The third portion 12c is disposed between the first portion 12a and the second portion 12b. The first portion 12a is used as one of the source or drain of the switch element 11. The second portion 12b is used as the other of the source or drain. The third portion 12c is used as the channel portion of the switch element 11.

The switch element 11 further includes the gate 11g and a gate insulator film 11i. The gate insulator film 11i is provided between the third portion 12c and the gate 11g. In the example, the third portion 12c is disposed on the gate 11g. In the example, the switch element 11 has a bottom-gate structure. In the embodiment, the switch element 11 may have a top-gate structure.

A first metal layer is used as at least one of the gate line GL or the gate 11g. The first metal layer includes, for example, at least one of Mo (molybdenum), Al (aluminum), Cu (copper), or an alloy of these elements. For example, the first metal layer includes Mo.

The semiconductor layer 12 includes, for example, at least one of polysilicon, amorphous silicon, or crystalline silicon.

An oxide semiconductor may be used as the semiconductor layer 12. For example, the semiconductor layer 12 may include an oxide including at least one of indium (In), gallium (Ga), or zinc (Zn).

The signal line SL is electrically connected to the first portion 12a. In the example, a portion (a first connector 15a) of the signal line SL is electrically connected to the first portion 12a. In the example, the first connector 15a is electrically connected to the first portion 12a by a first connecting conductive portion 15c.

On the other hand, a second connecting conductive portion 15d is provided on the second portion 12b. A second connector 15b is provided on the second connecting conductive portion 15d.

A second metal layer is used as the first connector 15a (the signal line SL), the first connecting conductive portion 15c, the second connector 15b, and the second connecting conductive portion 15d. The second metal layer includes, for example, at least one of Al, Cr (chrome), Ta (tantalum), or an alloy of these elements. For example, the second metal layer includes Al.

An inter-layer insulating layer 13 is provided between the first connector 15a (the signal line SL) and the semiconductor layer 12, between the first connecting conductive portion 15c and the semiconductor layer 12, between the second connector 15b and the semiconductor layer 12, and between the second connecting conductive portion 15d and the semiconductor layer 12.

The inter-layer insulating layer 13 includes, for example, a metal oxide, etc. The inter-layer insulating layer 13 includes, for example, at least one of silicon oxide, silicon nitride, or silicon oxynitride.

In the example, the common line CL is provided on the second metal layer of the signal line SL, etc. A first insulating layer I1 is provided between the common line CL and the signal line SL. The first insulating layer I1 is provided between the multiple signal lines SL and the multiple common lines CL.

For example, the first insulating layer I1 functions as a planarization layer. For example, the first insulating layer I1 includes an organic material. The first insulating layer I1 includes, for example, at least one of an acrylic resin or a polyimide resin. Good flatness is obtained by using the organic material as the first insulating layer I1.

The pixel electrode Px is provided on the common line CL. In the example, the pixel electrode Px has a comb-shaped configuration; and the pixel electrode Px includes multiple portions Pxs having band configurations. The multiple portions Pxs are separated from each other in the X-Y plane. The pixel electrode Px is electrically connected to the second connector 15b. In the example, the pixel electrode Px is electrically connected to the second connector 15b by a third connecting conductive portion 17.

For example, a light-transmissive conductive layer is used as at least one of the common line CL or the pixel electrode Px. For example, at least one of the common line CL or the pixel electrode Px includes an oxide including at least one element selected from the group consisting of In, Sn, Zn, and Ti. The common line CL and the pixel electrode Px include, for example, ITO (Indium Tin Oxide), etc. For example, thin metal layers that are light-transmissive may be used as the common line CL and the pixel electrode Px. As described below, a supplemental line may be provided for the common line CL.

A second insulating layer I2 is provided between the pixel electrode Px and the common line CL. In the example, at least a portion of the multiple common lines CL is disposed between at least a portion of one of the multiple pixel electrodes Px and at least a portion of one of the multiple signal lines SL. Also, the second insulating layer I2 is disposed between the at least a portion of the multiple common lines CL recited above and the at least a portion of the one of the multiple pixel electrodes Px recited above.

The second insulating layer I2 may include, for example, the same material as the first insulating layer I1. The second insulating layer I2 may include, for example, a metal compound (an oxide, a nitride, an oxynitride, etc.). The material of the second insulating layer I2 is arbitrary.

In the example, a first alignment film 18 is provided on the pixel electrode Px.

The second substrate unit 20u is separated from the first substrate unit 10u in the Z-axis direction. In the example, the second substrate unit 20u includes a second substrate 20, a color filter layer 25, a second alignment film 28, and the sense lines RL (the fourth lines L4). The sense lines RL are separated from the switch elements 11 and the multiple pixel electrodes Px. The second substrate 20 is provided between the sense lines RL and the first substrate unit 10u. The color filter layer 25 is provided between the second substrate 20 and the first substrate unit 10u. The second alignment film 28 is provided between the color filter layer 25 and the first substrate unit 10u.

In the example, the second substrate 20 is light-transmissive. The second substrate 20 includes, for example, glass or a resin.

The sense line RL is, for example, light-transmissive. The sense line RL includes an oxide (e.g., ITO, etc.) including at least one element selected from the group consisting of In, Sn, Zn, and Ti, etc. A thin metal layer that is light-transmissive may be used as the sense line RL.

The color filter layer 25 includes, for example, a red colored layer, a green colored layer, a blue colored layer, etc. The red colored layer, the green colored layer, and the blue colored layer are disposed to respectively correspond to the multiple pixels 35. The color filter layer 25 may have four or more colors. In the embodiment, the color filter layer 25 may be omitted. The color filter layer may be provided in the first substrate unit 10u.

The first alignment film 18 and the second alignment film 28 include, for example, polyimide, etc. Alignment processing (e.g., rubbing, etc.) of these alignment films is performed as necessary.

The display layer 30 is provided between the first substrate unit 10u and the second substrate unit 20u. The display layer 30 is disposed between the multiple pixel electrodes Px and the multiple sense lines RL. For example, the display layer 30 is disposed between the first alignment film 18 and the second alignment film 28.

A first polarizing layer 51 and a second polarizing layer 52 are provided in the example. The first substrate unit 10u is disposed between the first polarizing layer 51 and the second polarizing layer 52. The second substrate unit 20u is disposed between the first substrate unit 10u and the second polarizing layer 52.

A backlight unit 55 is further provided in the example. The first polarizing layer 51, the first substrate unit 10u, the display layer 30, and the second substrate unit 20u are disposed between the backlight unit 55 and the second polarizing layer 52. The backlight unit 55 emits light. The light passes through the first polarizing layer 51, the first substrate unit 10u, the display layer 30, the second substrate unit 20u, and the second polarizing layer 52 and is emitted outside the display device 110.

In the example, the pixel electrode Px includes the multiple portions Pxs having band configurations. A "lateral electric field" is generated between the pixel electrode Px and the common line CL. The lateral electric field is an electric field having a component parallel to the X-Y plane. The director (the long-axis direction of the liquid crystal molecules) of the liquid crystal molecules of the display layer 30 (the liquid crystal layer) is caused to change in the X-Y plane by the lateral electric field. For example, at least one of birefringence or optical rotatory properties changes due to the change of the direction of the director. In other words, a change of an optical characteristic occurs. The change of the optical characteristic is converted to a change of the transmittance by using a polarizing layer.

The transmittance of the light emitted from the backlight unit 55 changes due to the change of the optical characteristic. The transmittance of the light changes, that is, the brightness changes according to the electrical signal (the image signal) provided to the pixel electrode Px. The light of which the brightness has changed is emitted from an upper surface Uf of the display device 110. Thereby, the display is performed.

On the other hand, the touch input to the upper surface Uf of the display device 110 is sensed by the multiple sense lines RL and the multiple common lines CL.

At least a portion of the controller 60 may be provided in the first substrate unit 10*u*. At least a portion of the controller 60 may be included in the drive device 210 of the display device (referring to FIG. 2). At least a portion of the drive device 210 may be included in the controller 60.

An example of the operations of the display device 110 will now be described.

Figure 4:
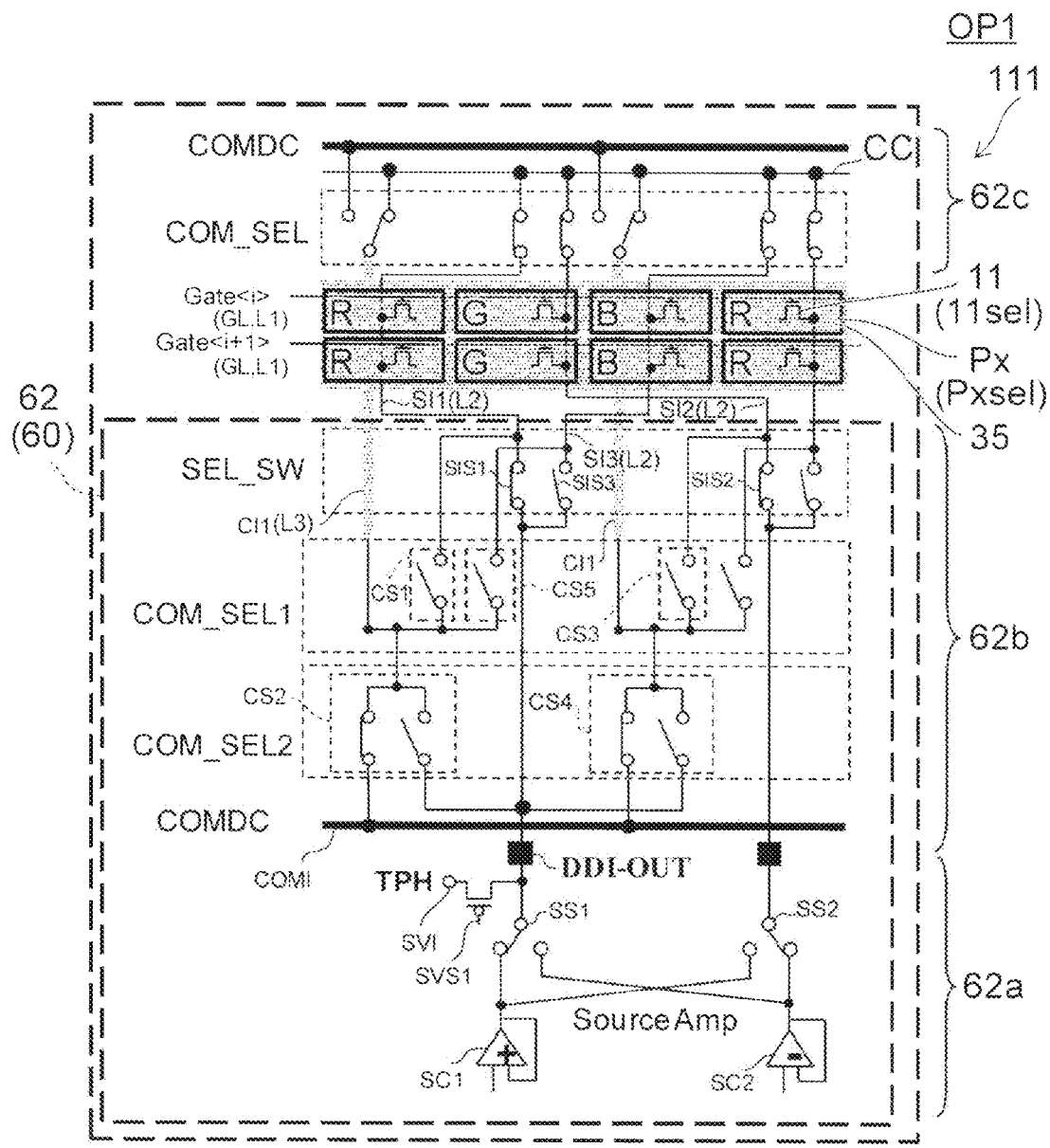
FIG. 4 is a schematic view illustrating the display device according to the first embodiment.

FIG. 4 is a schematic view illustrating the display device according to the first embodiment.

FIG. 4 shows a portion of a display device 111 according to the embodiment. The configuration described in regard to the display device 110 is applied to the portions other than that illustrated in FIG. 4.

As illustrated in FIG. 4, the multiple first lines L1 (the gate lines GL) include an ith gate line Gate<i> and an (i+1)th gate line Gate<i+1>.

For example, the pixel electrodes Px that correspond to red (R), green (G), and blue (B) are disposed.

The multiple second lines L2 (the signal lines SL) include a first signal line SI1. For example, the first signal line SI1 corresponds to a first color pixel (e.g., an R pixel). In the example, the multiple second lines L2 further include a second signal line SI2 and a third signal line SI3. For example, the second signal line SI2 corresponds to a second color pixel (e.g., a G pixel). For example, the third signal line SI3 corresponds to a third color pixel (e.g., a B pixel).

The multiple third lines L3 (the common lines CL) include a first common line CI1.

The controller 60 includes a display counter potential line COMI, a sense potential line SVI, a first sense potential switch SVS1, a first signal line switch SIS1, a first common selector CS1, and a second common selector CS2.

In FIG. 4, the second lines L2 and the third lines L3 are connected via signal line switches and common selectors. In other words, the controller 60 includes at least one switch between the second lines L2 and the third lines L3.

The display counter potential line COMI is set to a display counter potential COMDC. The display counter potential COMDC is, for example, 0 volts (e.g., a ground potential) to −1 volts. This value is an example; and the embodiment is not limited to this value.

The sense potential line SVI is set to a potential (e.g., a touch operation potential TPH) that is different from the display counter potential COMDC. The touch operation potential TPH is, for example, 4 volts to 10 volts. This value is an example; and the embodiment is not limited to this value.

One end of the first sense potential switch SVS1 is electrically connected to the sense potential line SVI (the touch operation potential TPH).

One end of the first signal line switch SIS1 is electrically connected to the first signal line SI1. The other end of the first signal line switch SIS1 is electrically connected to the other end of the first sense potential switch SVS1. The potential (the signal) of the other end of the first sense potential switch SVS1 is called a signal DDI-OUT. The signal DDI-OUT is the output of the display drive integrated circuit 62*a*.

One end of the first common selector CS1 is electrically connected to the first signal line SI1. The other end of the first common selector CS1 is electrically connected to the first common line CI1.

One end of the second common selector CS2 is electrically connected to the first common line CI1 and the other end of the first common selector CS1. The second common selector CS2 electrically connects the first common line CI1 to one of the display counter potential line COMI or the other end of the first sense potential switch SVS1.

In the example, the controller 60 further includes a first source circuit SC1 and a first source switch SS1. The first source circuit SC1 is capable of outputting a signal of a portion of the image signal.

One end of the first source switch SS1 is electrically connectable to the first source circuit SC1. The other end of the first source switch SS1 is electrically connected to the other end of the first sense potential switch SVS1.

In the example, the controller 60 further includes a second signal line switch SIS2, a third common selector CS3, and a fourth common selector CS4.

One end of the second signal line switch SIS2 is electrically connected to the second signal line SI2. One end of the third common selector CS3 is electrically connected to the second signal line SI2. The other end of the third common selector CS3 is electrically connected to the first common line CI1.

One end of the fourth common selector CS4 is electrically connected to the first common line CI1 and the other end of the third common selector CS3. The fourth common selector CS4 electrically connects the first common line CI1 to one of the display counter potential line COMI or the other end of the first sense potential switch SVS1.

In the example, the controller 60 further includes a second source circuit SC2 and a second source switch SS2.

The second source circuit SC2 is capable of outputting a signal that is different from the signal of the portion of the image signal recited above (the signal of the first source circuit SC1). For example, the polarity of the signal output from the second source circuit SC2 is the opposite of the polarity of the signal output from the first source circuit SC1.

One end of the second source switch SS2 is electrically connectable to the second source circuit SC2. The other end of the second source switch SS2 is electrically connected to the other end of the second signal line switch SIS2.

Further, in the example, the controller 60 further includes a third signal line switch SIS3 and a fifth common selector CS5.

One end of the third signal line switch SIS3 is electrically connected to the third signal line SI3. The other end of the third signal line switch SIS3 is electrically connected to the other end of the first sense potential switch SVS1.

One end of the fifth common selector CS5 is electrically connected to the third signal line SI3. The other end of the fifth common selector CS5 is electrically connected to the first common line Cl1.

For example, the first signal line switch SIS1, the second signal line switch SIS2, and the third signal line switch SIS3 are included in a selector switch SEL_SW.

For example, the first common selector CS1, the third common selector CS3, and the fifth common selector CS5 are included in a common selector COM_SEL1. The second common selector CS2 and the fourth common selector CS4 are included in a common selector COM_SEL2.

A common selector COM_SEL is provided in the example. The gate lines GL are disposed between the common selector COM_SEL and the selector switch SEL_SW. The common selector COM_SEL electrically connects each of the common lines CL (e.g., the first common line Cl1) to one of the display counter potential COMDC or a line CC. The common selector COM_SEL and the line CC are included in a third circuit unit 62c.

For example, the selector switch SEL_SW, the common selector COM_SEL1, the common selector COM_SEL2, the common selector COM_SEL, the display counter potential COMDC, and the line CC are provided on, for example, the first substrate 10.

For example, a circuit unit 62b that includes the selector switch SEL_SW, the common selector COM_SEL1, the common selector COM_SEL2, and the display counter potential COMDC is provided along one side of the first substrate 10. The display counter potential COMDC and the line CC are provided along another side of the first substrate 10.

The sides recited above are sides of the first substrate 10 orthogonal to the second direction in which the third lines L3 extend. For example, the circuit unit 62b is provided in a frame region of the first substrate 10 outside the display region.

For example, the first source circuit SC1, the second source circuit SC2, the first source switch SS1, the second source switch SS2, and the first sense potential switch SVS1 are included in a first circuit unit 62a. The source circuit includes a source amplifier. The first circuit unit 62a is, for example, an IC chip. For example, the first circuit unit 62a is mounted on the first substrate 10 by a method such as COG, etc. Here, the first circuit unit 62a is the display drive integrated circuit 62a including a source circuit.

A first operation and a second operation are implemented by the display device 111 (the display device 110). The first operation is, for example, a display operation. The second operation is a non-display operation. The second operation is, for example, an input sensing operation.

The display device 111 performs the input sensing by applying the touch sensing pulse signal to the third lines L3 using the output of the display drive integrated circuit 62a. Thus, by performing the input sensing using the output of the display drive integrated circuit 62a that is used also in the display operation, a circuit for the touch driver for driving the third lines L3 can be omitted.

Also, because the common lines CL and the signal lines SL have a parallel structure in the display device 111, there are cases where the lines routed to the common lines CL can be shorter and the operation speed of the touch sensing can be increased.

Because it is possible to arbitrarily select the touch drive electrodes that are driven using the output of the source amplifier, the drive electrode can be driven while being thinned out; and a portion of the drive electrodes can be driven partially.

FIG. 4 shows the state of a first operation OP1 of the display device 111. An example of the first operation OP1 will now be described.

Figure 5:
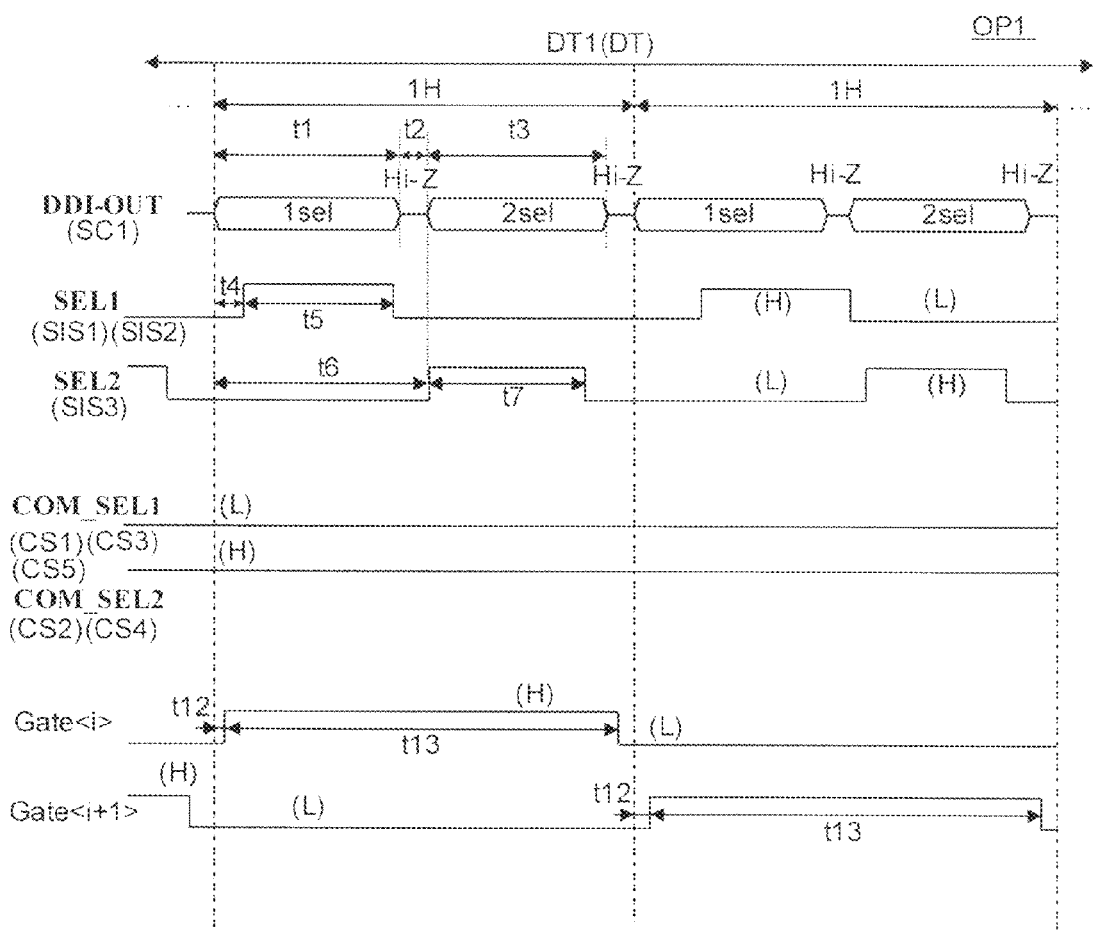
FIG. 5 is a schematic view illustrating the first operation of the display device according to the first embodiment.

FIG. 5 is a schematic view illustrating the first operation of the display device according to the first embodiment.

FIG. 5 is a timing chart of the first operation OP1. The horizontal axis of FIG. 5 is time.

The first operation OP1 is implemented in a display interval DT as illustrated in FIG. 5. For example, the display interval DT includes a first display interval DT1 to a kth display interval. In the first display interval DT1, the first to kth gate lines GL are scanned by being sequentially selected. In a second display interval (not illustrated), the (k+1)th to 2 kth gate lines GL are scanned by being sequentially selected. The scanning interval (1H) of the ith gate line Gate<i> and the scanning interval (1H) of the (i+1)th gate line Gate<i+1> that are included in the first display interval DT1 are illustrated in FIG. 5.

In the example, for example, the signal DDI-OUT corresponds to the output of the first source circuit SC1.

A signal SEL1 is the signal of the first signal line switch SIS1. The signal of the second signal line switch SIS2 is the same as the signal of the first signal line switch SIS1. A signal SEL2 is the signal of the third signal line switch SIS3. These switches are switched to the conducting state when these signals are in the high state "H." These switches are switched to the nonconducting (disconnected) state in the low state "L."

For the common selector COM_SEL1 (the first common selector CS1, the third common selector CS3, and the fifth common selector CS5), these common selectors (switches) electrically conduct in the high state "H." In the low state "L," these common selectors (switches) are switched to the electrically nonconducting (disconnected) state.

For the common selector COM_SEL2 (the second common selector CS2 and the fourth common selector CS4), each of the other ends of the common selector COM_SEL1 (the first common selector CS1, the third common selector CS3, and the fifth common selector CS5) is connected to the display counter potential line COMI (the display counter potential COMDC) in the high state "H." In the low state "L," each of the other ends of the common selector COM_SEL1 (the first common selector CS1, the third common selector CS3, and the fifth common selector CS5) is connected to the other end of the first sense potential switch SVS1.

In the first operation OP1 (the display operation), the switch elements 11 are switched to the electrically conducting state when the ith gate line Gate<i> and the (i+1)th gate line Gate<i+1> are in the high state "H." In the low state "L," the switch elements 11 are switched to the nonconducting (disconnected) state.

For example, the ith gate line Gate<i> is switched to the conducting state in the interval of one 1H. The time between the start of an interval of 1H and the start of the conducting state of the gate line is a time t12. Subsequently, the conducting state is provided for a time t13. In one other interval of 1H, the (i+1)th gate line Gate<i+1> is switched to the conducting state.

The first source circuit SC1 outputs an image signal 1sel for a time t1 inside the interval of 1H. For a time t2 (an interval Hi-Z of high impedance) after the time t1, the first source circuit SC1 pauses the output of the image signal. For a time t3 after the time t2, the first source circuit SC1 outputs an image signal 2sel. For a time (the interval Hi-Z) after the time t3, the first source circuit SC1 pauses the output of the image signal.

For a time t5, the first signal line switch SIS1 and the second signal line switch SIS2 are switched to the high state "H." The time between the start of the time t1 and the start of the time t5 is a time t4. The first signal line switch SIS1 and the second signal line switch SIS2 are in the low state "L" for the time t2 and the time t3.

The third signal line switch SIS3 is in the low state "L" for the time t1. The time between the start of the time t1 and the start of the time t5 is the time t4. The third signal line switch SIS3 is switched to the high state "H" for a time t7. The time between the start of the time t1 and the start of the time t7 is a time t6.

On the other hand, the common selector COM_SEL1 (the first common selector CS1, the third common selector CS3, and the fifth common selector CS5) is in the low state "L." On the other hand, the common selector COM_SEL2 (the second common selector CS2 and the fourth common selector CS4) is in the high state "H."

In other words, the following are implemented in the first operation OP1 (the display operation).

The first sense potential switch SVS1 electrically disconnects the sense potential line SVI from the second common selector CS2.

The first source circuit SC1 outputs a signal of a portion of the image signal.

The first source switch SS1 electrically connects the first source circuit SC1 to the other end of the first signal line switch SIS1.

The first signal line switch SIS1 electrically connects the other end of the first source switch SS1 to the first signal line SI1.

The first common selector CS1 electrically disconnects the first signal line SI1 from the second common selector CS2.

The second common selector CS2 electrically connects the first common line CI1 to the display counter potential line COMI.

Thereby, the desired display is performed at the pixels 35 corresponding to the first signal line SI1.

Further, as illustrated in FIG. 4, the following are performed in the first operation OP1.

The second source circuit SC2 outputs a signal that is different from the first source circuit SC1.

The second source switch SS2 electrically connects the second source circuit SC2 to the other end of the second signal line switch SIS2.

The second signal line switch SIS2 electrically connects the other end of the second source switch SS2 to the second signal line SI2.

The third common selector CS3 electrically disconnects the second signal line SI2 from the fourth common selector CS4.

The fourth common selector CS4 electrically connects the first common line CI1 to the display counter potential line COMI.

Thereby, the desired display is performed at the pixels 35 corresponding to the second signal line SI2.

Further, as illustrated in FIG. 4, the following are performed in the first operation OP1.

The third signal line switch SIS3 electrically disconnects the other end of the first source switch SS1 from the third signal line SI3.

The fifth common selector CS5 electrically disconnects the third signal line SI3 from the second common selector.

Thereby, the desired display is performed at the pixels 35 corresponding to the third signal line SI3.

Figure 6:
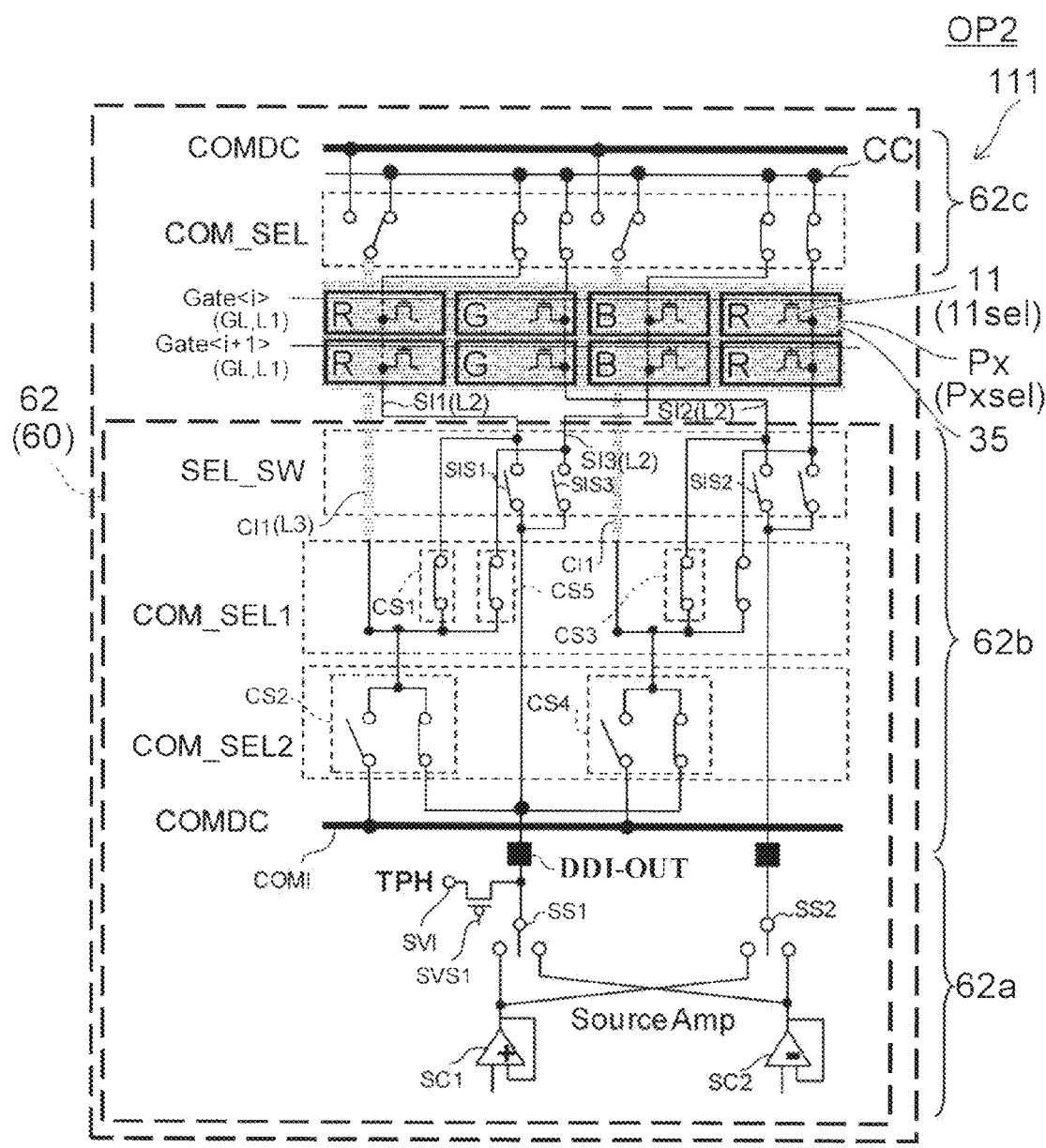
FIG. 6 is a schematic view illustrating the display device according to the first embodiment.

FIG. 6 is a schematic view illustrating the display device according to the first embodiment.

FIG. 6 shows the state of a second operation OP2 (the non-display operation) of the display device 111. In the example, the sense operation is performed in the second operation OP2.

As illustrated in FIG. 6, the following are performed in the second operation OP2.

The first sense potential switch SVS1 electrically connects the sense potential line SVI to the second common selector CS2.

The first signal line switch SIS1 electrically disconnects the first signal line SI1 from the other end of the first sense potential switch SVS1.

The first common selector CS1 electrically connects the first signal line SI1 to the first common line CI1.

The second common selector CS2 electrically connects the first common line CI1 to one of the display counter potential line COMI or the other end of the first sense potential switch SVS1 alternately and repeatedly. Thereby, sensing that uses the first common line CI1 is performed.

At this time, the first source switch SS1 electrically disconnects the first source circuit SC1 from the other end of the first signal line switch SIS1.

Further, the following are performed in the second operation OP2.

The third common selector CS3 electrically connects the third signal line SI3 to the first common line CI1.

The fourth common selector CS4 electrically connects the first common line CI1 to one of the display counter potential line COMI or the other end of the first sense potential switch SVS1 alternately and repeatedly.

At this time, the second source switch SS2 electrically disconnects the second source circuit SC2 from the other end of the second signal line switch SIS2.

Further, the following are performed in the second operation OP2.

The third signal line switch SIS3 electrically disconnects the third signal line SI3 from the other end of the first sense potential switch SVS1.

The fifth common selector CS5 electrically connects the third signal line SI3 to the first common line CI1.

Thereby, in the second operation OP2, the first signal line SI1, the second signal line SI2, the third signal line SI3, and the first common line CI1 have substantially the same potential. For example, the sensing of the touch input is performed in this state.

In the example, in the second operation, the first circuit unit 62a outputs the voltage of the sense potential line SVI included in the first circuit unit 62a; and the touch sensing pulse signal that is generated from the potential of the output and the potential of the display counter potential line COMI included in the second circuit unit 62b is applied to the selected third lines L3. It is sufficient for the potential of the sense potential line SVI and the voltage of the display counter potential line COMI to be different voltages. The display counter potential line COMI may be the counter voltage applied to the common lines CL which are the counter electrodes of the display in the first operation OP1.

Figure 7:
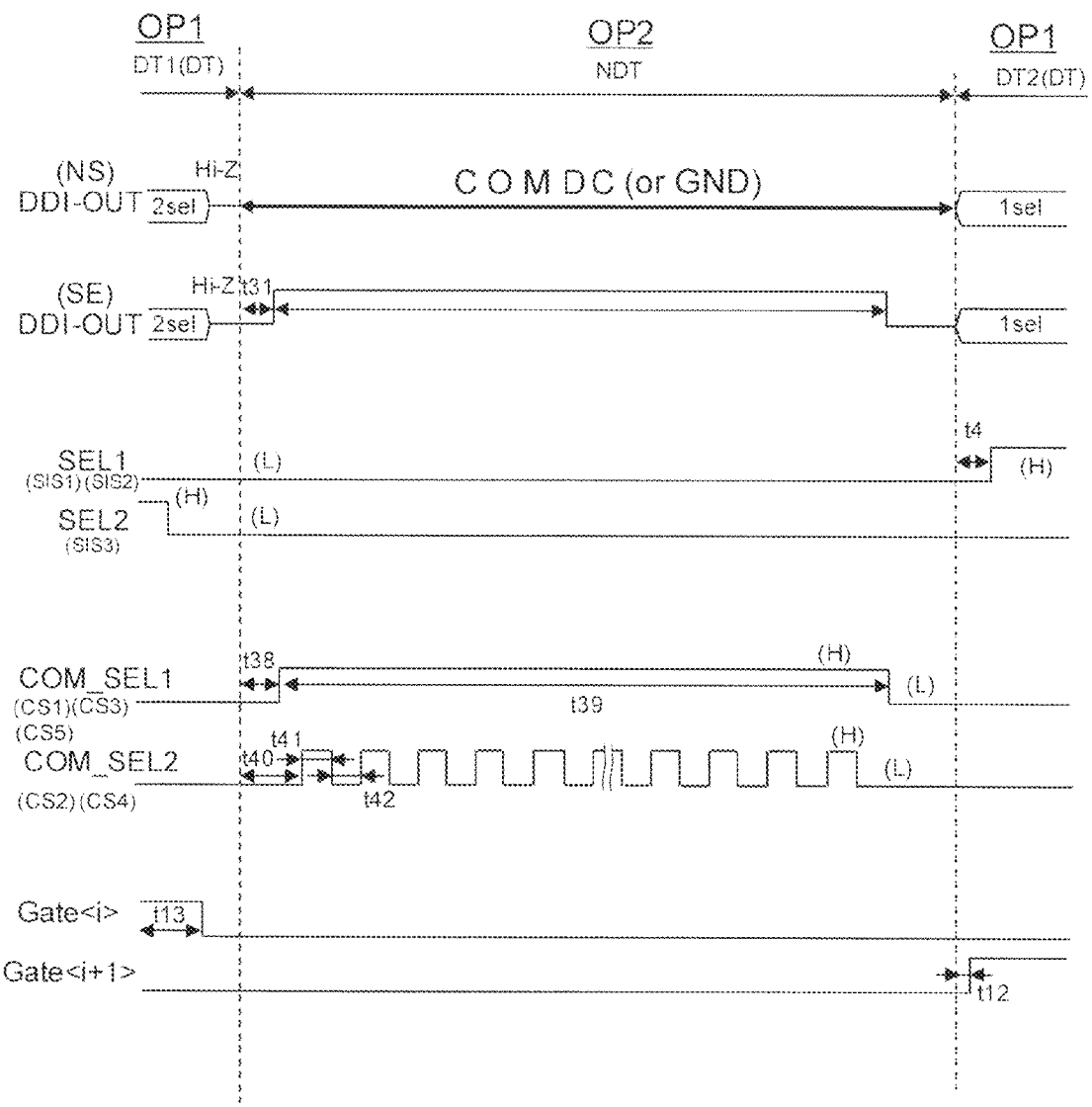
FIG. 7 is a schematic view illustrating the second operation of the display device according to the first embodiment.

FIG. 7 is a schematic view illustrating the second operation of the display device according to the first embodiment.

FIG. 7 is a timing chart of the second operation OP2.

As illustrated in FIG. 7, a non-display interval NDT is provided between two first operations OP1 (the first display interval DT1 and a second display interval DT2). The second operation OP2 is implemented in the non-display interval NDT.

In the example, the sensing of the input is performed in the second operation OP2. At this time, the multiple common lines CL are sequentially switched to a selected state SE. The common lines CL that are not in the selected state SE are switched to an unselected state NS.

The signal DDI-OUT in the unselected state NS and the signal DDI-OUT in the selected state SE are illustrated in FIG. 7.

In the unselected state NS, the signal DDI-OUT is set to the display counter potential COMDC. The signal DDI-OUT may be set to a ground potential GND.

In the selected state SE, the signal DDI-OUT is set to the potential (e.g., the touch operation potential TPH) of the sense potential line SVI. The time between the start of the potential of the sense potential line SVI and the start of the non-display interval NDT for the signal DDI-OUT in the selected state SE is a time t31.

The signal SEL1 (the first signal line switch SIS1 and the second signal line switch SIS2) is in the low state "L" in the non-display interval NDT. The signal SEL2 (the third signal line switch SIS3) also is in the low state "L" in the non-display interval NDT.

On the other hand, the common selector COM_SEL1 (the first common selector CS1, the third common selector CS3, and the fifth common selector CS5) is in the high state "H" in a portion of the non-display interval NDT. The time between the start of the non-display interval NDT and the start of the high state "H" for the common selector COM_SEL1 is a time t38.

For the common selector COM_SEL2 (the second common selector CS2 and the fourth common selector CS4), the high state "H" and the low state "L" are repeated alternately in the non-display interval NDT. The voltages of the high state "H" and the low state "L," i.e., the touch sensing pulse signal, are applied to the first common line CI1. Then, for example, the touch input is sensed by the sense line RL (not illustrated in FIG. 7) and the first common line CI1. At this time, the first to third signal lines SI1 to SI3 are set to the same potential as the first common line CI1.

In the example, the time of the high state "H" of the common selector COM_SEL2 is, for example, a time t41. The time of the low state "L" of the common selector COM_SEL2 is a time t42. The time between the start of the non-display interval NDT and the start of the initial high state "H" of the common selector COM_SEL2 is a time t40.

Thus, in the display device 111 (the display device 110) according to the embodiment, the following are performed in the second operation OP2.

The controller 60 implements the following first operation OP1.

The controller 60 sets one of the multiple first lines L1 (e.g., the ith gate line <i> or the (i+1)th gate line <i+1>) to the select potential (the high state "H") in the display interval DT (e.g., the first display interval DT1, etc.). At this time, the controller 60 supplies the image signal to the multiple second lines L2 (the first to third signal lines SI1 to SI3, etc.). The multiple switch elements 11 include a selection switch element 11sel that is connected to the first line L1 that is set to the select potential. The multiple pixel electrodes Px include a selection pixel electrode Pxsel that is connected to the selection switch element 11sel. The controller 60 sets the selection pixel electrode Pxsel to the image potential based on the image signal and sets one of the multiple third lines L3 to the display counter potential COMDC. Thereby, the display operation is performed.

The controller 60 implements the following second operation OP2. The controller 60 sets the potential of at least one of the multiple second lines L2 to be the same as the potential of one of the multiple third lines L3 in the non-display interval NDT. In other words, for example, the potentials of the first to third signal lines SI1 to SI3 are set to be the same as the potential of the first common line CI1. In such a second operation OP2, for example, the sensing of the touch input is performed using the third lines L3 and the fourth lines L4.

In the embodiment, the third lines L3 extend to be aligned with the second lines L2. Then, in the second operation OP2, the potentials of the third lines L3 are set to be substantially the same as the potentials of the second lines L2. Therefore, a capacitance substantially is not formed between the third lines L3 and the second lines L2. Or, the capacitance can be set to be small. For example, in the second operation OP2, the load of the third lines L3 decreases drastically. For example, when sensing the touch input in the second operation OP2, the sense interval can be shortened; and the power consumption when sensing can be reduced. In other words, the operation speed of the sense interval can be increased using the third lines L3 and the fourth lines L4. The load of the third lines L3 decreases. The driving recited above can be realized using a small drive IC. The width of the frame around the display unit can be reduced. For example, the display device can be downsized.

In the case where the touch sensing pulse signal is generated inside an IC and routed to the third line L3, it is considered that there are cases where the IC is larger and the cost increases according to the drive voltage. Conversely, the output of the first circuit unit 62a on the IC is set to be the high voltage of the touch sensing pulse signal; and the pulse signal is generated with a low voltage/potential line having a separate line in the second circuit unit 62b in the frame region of the substrate. Thereby, the circuit of the frame region can be reduced inexpensively without enlarging the drive IC for displaying.

In the embodiment, high display quality can be maintained even in the case where, for example, the sensing of the touch input is performed as the second operation OP2 (the non-display operation). Also, the operation speed of the sense interval can be increased. A small drive IC can be used. The display device can be downsized.

In the embodiment, the sensing is performed in the second operation OP2. In other words, in the second operation OP2, the controller 60 senses the current flowing between at least one of the multiple fourth lines L4 and at least one of the multiple third lines L3. For example, the controller 60 senses the change of the current based on the change of the capacitance between at least one of the multiple fourth lines L4 and at least one of the multiple third lines L3 due to an object (e.g., a viewer, a user, an operator, etc.) approaching at least one of the multiple fourth lines L4.

In the embodiment, the non-display operation is performed in the second operation OP2. For example, in the second operation OP2, the noise occurring in at least a portion of the device may be measured. For example, a high-quality display can be provided by adjusting the display operation based on the measurement result of the noise.

In the display device 111 (the display device 110) according to the embodiment, the controller 60 includes the display counter potential line COMI, the source circuit (e.g., the first source circuit SC1), the selector switch SEL_SW, and the common selector COM_SEL (the first to fifth common selectors CS1 to CS5, etc.).

In the first operation OP1, the selector switch SEL_SW electrically connects the source circuit (e.g., the first source circuit SC1) to each of the multiple second lines L2. Then, the common selector COM_SEL electrically connects the display counter potential line COMI to each of the multiple third lines L3. In this state, the desired display is performed by supplying the image signals to the multiple second lines L2 by sequentially operating the multiple first lines L1.

On the other hand, in the second operation OP2, the selector switch SEL_SW electrically disconnects the source circuit from each of the multiple second lines L2. The common selector COM_SEL electrically connects at least one of the multiple third lines L3 to at least one of the multiple second lines L2. In this state, for example, the sensing is performed using the third lines L3 and the fourth lines L4. For example, the measurement of the noise may be performed.

Second Embodiment

Figure 8:
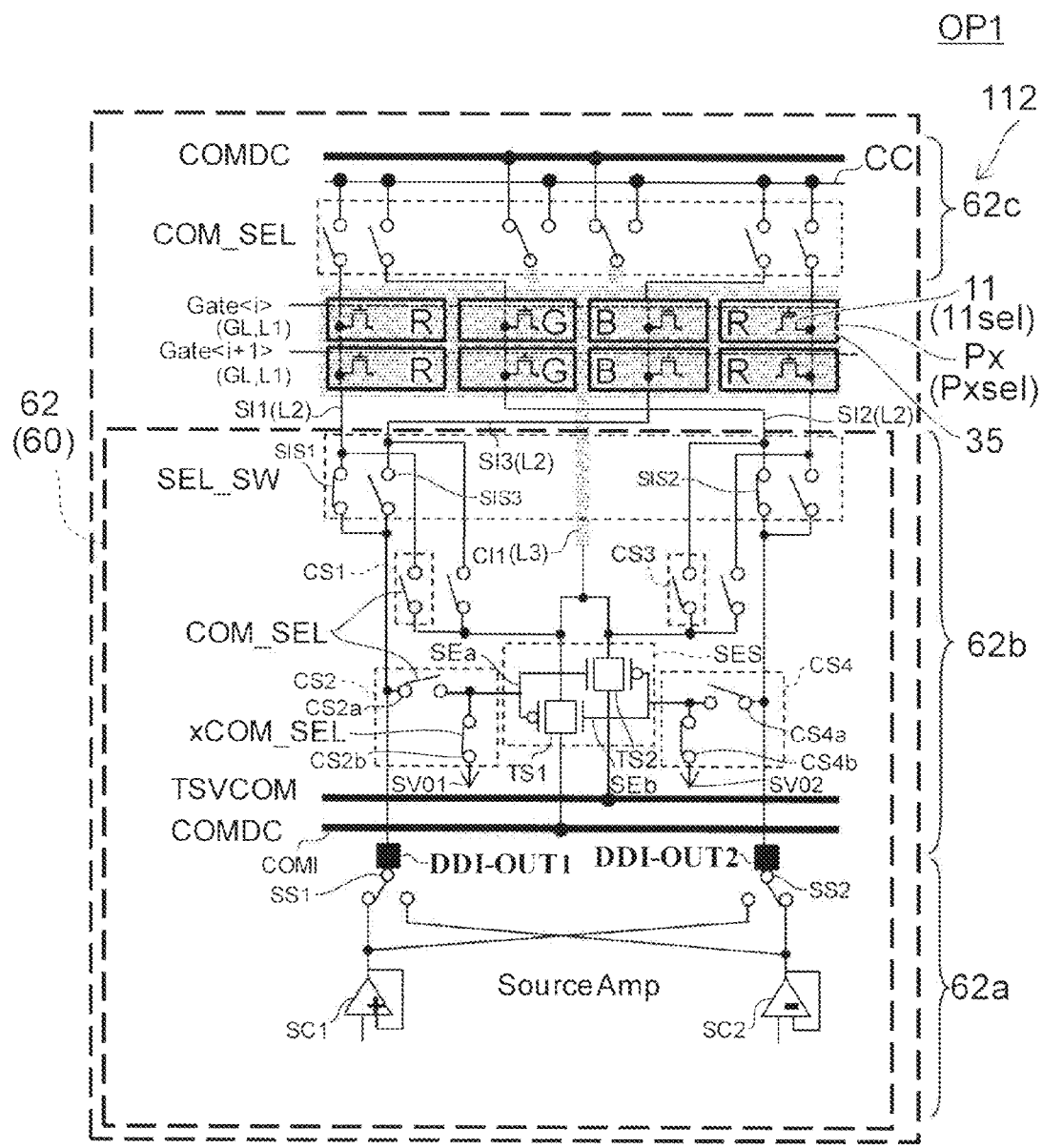
FIG. 8 is a schematic view illustrating a display device according to a second embodiment.

FIG. 8 is a schematic view illustrating a display device according to a second embodiment.

FIG. 8 shows a portion of the display device 112 according to the embodiment. The configuration that is described in regard to the display device 110 is applied to the portions other than that illustrated in FIG. 8.

As illustrated in FIG. 8, the multiple second lines L2 include the first signal line SI1 and the second signal line SI2. The multiple third lines L3 include the first common line CI1.

The controller 60 includes the display counter potential line COMI, a sense signal line TSVCOM, a reference potential line SV01, a reference potential line SV02, a first common line selector SES, the first source circuit SC1, the first source switch SS1, the second source circuit SC2, the second source switch SS2, the first signal line switch SIS1, the second signal line switch SIS2, and the first to fourth common selectors CS1 to CS4. The reference potential line SV02 is a potential line that is different from the reference potential line SV01.

In FIG. 8, the second lines L2 and the third lines L3 are connected via signal line switches, common selectors, and common line selectors.

The display counter potential line COMI is set to the display counter potential COMDC.

For example, the sense signal is input to the sense signal line TSVCOM.

The reference potential line SV01 is set to a reference potential (a low-level potential, e.g., the ground potential, etc.). For example, the reference potential line SV02 is set to a high-level potential. The sense signal is, for example, the touch sensing pulse signal that is generated from the two different voltages.

The first common line selector SES includes a first control terminal SEa and a second control terminal SEb. The first control terminal SEa receives the control signal. The second control terminal SEb receives a signal that is the inverted control signal. The first common line selector SES connects the first common line CI1 to one of the display counter potential line COMI or the sense signal line TSVCOM according to the control signal.

The first source circuit SC1 is capable of outputting a signal of a portion of the image signal.

One end of the first source switch SS1 is electrically connectable to the first source circuit SC1.

The second source circuit SC2 is capable of outputting a signal that is different from the signal of the portion of the image signal recited above.

One end of the second source switch SS2 is electrically connectable to the second source circuit SC2.

One end of the first signal line switch SIS1 is electrically connected to the first signal line SI1. The other end of the first signal line switch SIS1 is electrically connected to the other end of the first source switch SS1.

One end of the second signal line switch SIS2 is electrically connected to the second signal line SI2. The other end of the second signal line switch SIS2 is electrically connected to the other end of the second source switch SS2.

One end of the first common selector CS1 is electrically connected to the first signal line SI1. The other end of the first common selector CS1 is electrically connected to the first common line CI1.

One end of the second common selector CS2 is electrically connected to the first control terminal SEa. The second common selector CS2 electrically connects the first control terminal SEa to one of the reference potential line SV01 or the other end of the first source switch SS1.

One end of the third common selector CS3 is electrically connected to the second signal line SI2. The other end of the third common selector CS3 is electrically connected to the first common line CI1.

One end of the fourth common selector CS4 is electrically connected to the second control terminal SEb. The fourth common selector CS4 electrically connects the second control terminal SEb to one of the reference potential line SV02 or the other end of the second source switch SS2.

In the example, the first common line selector SES includes a first transmission gate TS1 and a second transmission gate TS2. One end of the first transmission gate TS1 is connected to the first common line CI1. The other end of the first transmission gate TS1 is connected to the display counter potential line COMI. One end of the second transmission gate TS2 is connected to the first common line CI1. The other end of the second transmission gate TS2 is connected to the sense signal line TSVCOM. The negative gate of the first transmission gate TS1 is connected to the positive gate of the second transmission gate TS2. The positive gate of the first transmission gate TS1 is connected to the negative gate of the second transmission gate TS2. One of these gates is used as the first control terminal SEa. The other of these gates is used as the second control terminal SEb.

FIG. 8 shows the first operation OP1 (the display operation) of the display device 112.

In the first operation OP1, the first source circuit SC1 outputs a signal of a portion of the image signal. The second source circuit SC2 outputs a signal that is different from the signal of the one portion recited above.

One end of the first source switch SS1 is electrically connected to the first source circuit SC1.

One end of the second source switch SS2 is electrically connected to the second source circuit SC2.

The first signal line switch SIS1 electrically connects the first signal line SI1 to the other end (a first signal output DDI-OUT1) of the first source switch SS1.

The second signal line switch SIS2 electrically connects the second signal line SI2 to the other end (a second signal output DDI-OUT2) of the second source switch SS2.

The first common selector CS1 electrically disconnects the first signal line SI1 from the first common line CI1.

The second common selector CS2 electrically connects the first control terminal SEa to the reference potential line SV01.

The third common selector CS3 electrically disconnects the second signal line SI2 from the first common line CI1.

The fourth common selector CS4 electrically connects the second control terminal SEb to the reference potential line SV02.

Thereby, the desired display is performed at the pixels 35 corresponding to the first signal line SI1 and the second signal line SI2. A similar operation is performed for the other pixels 35 as well.

In the example, the second common selector CS2 includes a first switch CS2a and a second switch CS2b. One end of the first switch CS2a is connected to the first control terminal SEa. The other end of the first switch CS2a is connected to the other end (the first signal output DDI-OUT1) of the first source switch SS1. One end of the second switch CS2b is connected to the first control terminal SEa. The other end of the second switch CS2b is connected to the reference potential line SV01.

The fourth common selector CS4 includes a third switch CS4a and a fourth switch CS4b. One end of the third switch CS4a is connected to the second control terminal SEb. The other end of the third switch CS4a is connected to the other end (the second signal output DDI-OUT2) of the second source switch SS2. One end of the fourth switch CS4b is connected to the second control terminal SEb. The other end of the fourth switch CS4b is connected to the reference potential line SV02.

The first switch CS2a and the third switch CS4a are controlled by the signal of the common selector COM_SEL. The second switch CS2b and the fourth switch CS4b are controlled by the signal of the inverted common selector signal xCOM_SEL. The signal of the inverted common selector signal xCOM_SEL is the inverted signal of the signal of the common selector COM_SEL.

On the other hand, the first common selector CS1 and the third common selector CS3 are controlled by the signal of the common selector COM_SEL.

Thereby, the first operation OP1 recited above is implemented. The configuration described in regard to FIG. 5 and modifications of the configuration can be used for the timing chart of the first operation OP1 of the display device 112; and a description is omitted.

Figure 9:
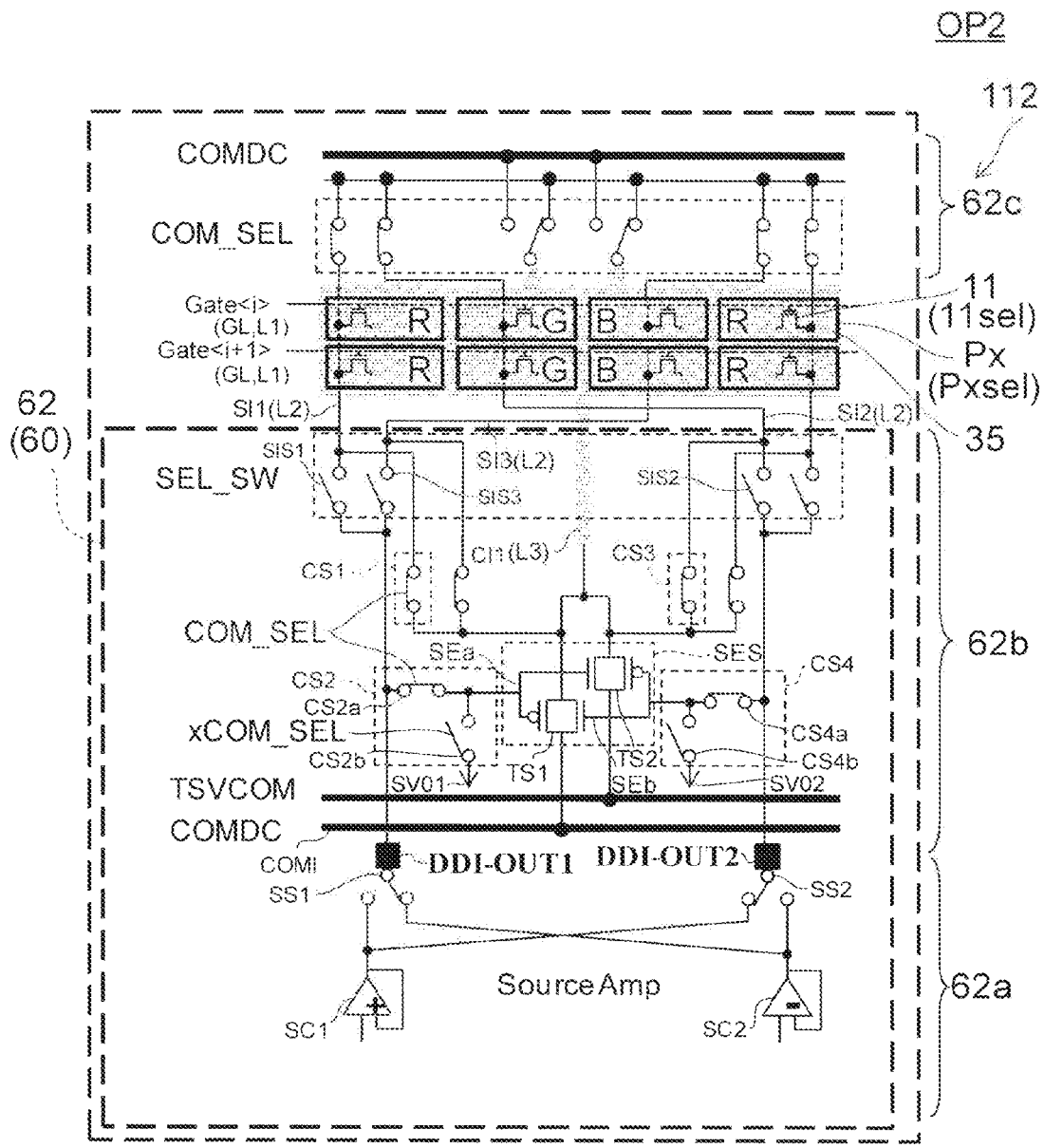
FIG. 9 is a schematic view illustrating the display device according to the second embodiment.

FIG. 9 is a schematic view illustrating the display device according to the second embodiment.

FIG. 9 shows the state of the second operation OP2 (the non-display operation) of the display device 112. In the example, the sense operation is performed in the second operation OP2.

As illustrated in FIG. 9, the following operations are performed by the controller 60 in the second operation OP2.

The first source circuit SC1 outputs the first voltage (the high-level voltage). The second source circuit SC2 outputs the second voltage (the low-level voltage). The second voltage is lower than the first voltage.

The first voltage and the second voltage can be output from source amplifiers of the source circuit; and the first circuit unit 62a controls the application of the sense signal to the third lines L3 using the output of these voltages.

One end of the first source switch SS1 is electrically connected to the second source circuit SC2.

One end of the second source switch SS2 is electrically connected to the first source circuit SC1.

The first signal line switch SIS1 electrically disconnects the first signal line SI1 from the other end of the first source switch SS1.

The second signal line switch SIS2 electrically disconnects the second signal line SI2 from the other end of the second source switch SS2.

The first common selector CS1 electrically connects the first signal line SI1 to the first common line CI1.

The second common selector CS2 electrically connects the first control terminal SEa to the other end of the first source switch SS1.

The third common selector CS3 electrically connects the second signal line SI2 to the first common line CI1.

The fourth common selector CS4 electrically connects the second control terminal SEb to the other end of the second source switch SS2.

For example, the sense signal of the sense signal line TSVCOM includes a pulse signal in which a high potential and a low potential that is lower than the high potential are repeated.

The current (the capacitance) that flows between the first common line CI1 (the third line L3) and the fourth line L4 is sensed using the pulse signal. Thereby, for example, the touch input is sensed.

Figure 10:
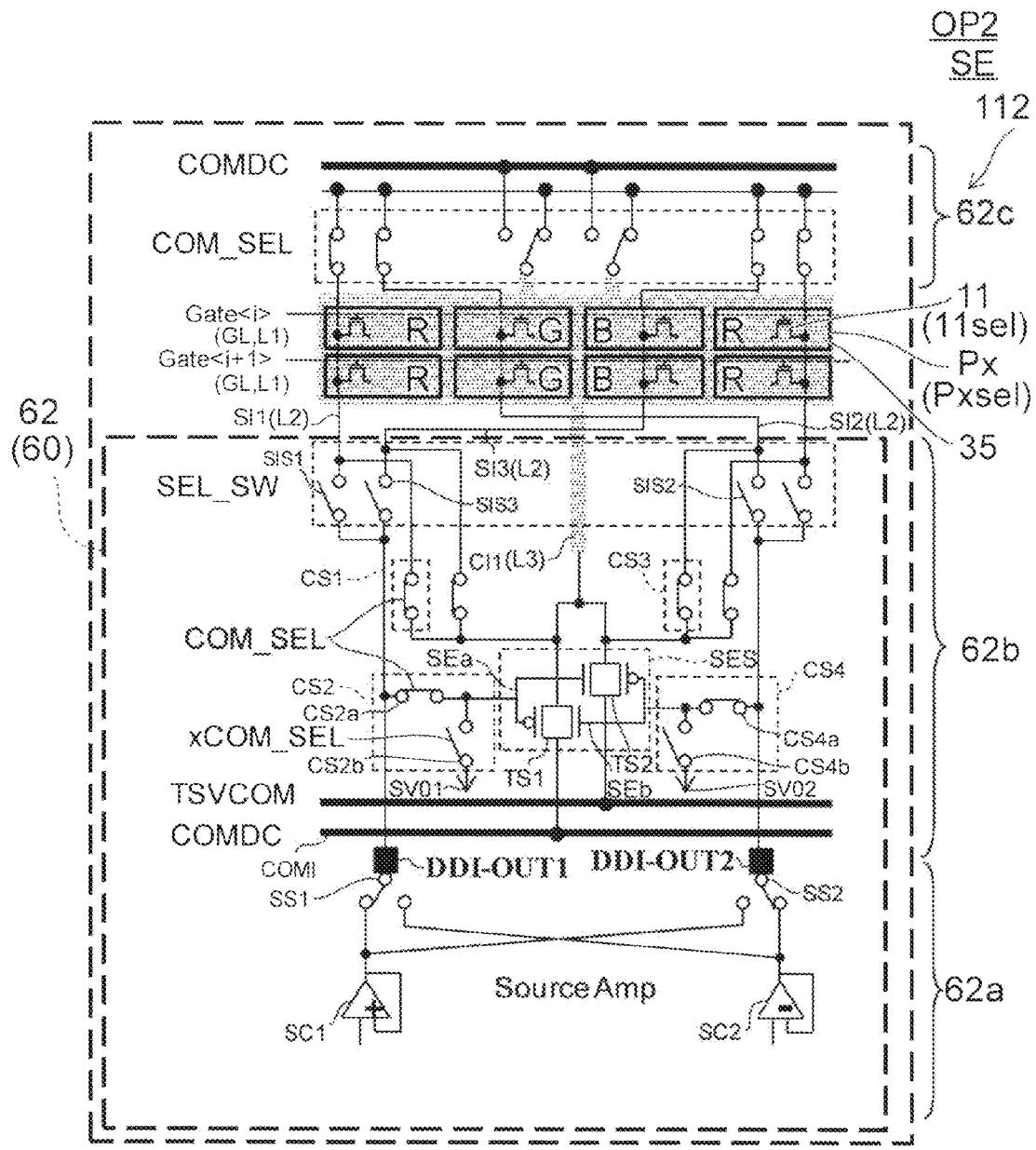
FIG. 10 is a schematic view illustrating an operation of the display device according to the second embodiment.

FIG. 10 is a schematic view illustrating an operation of the display device according to the second embodiment.

FIG. 10 shows a first state of the second operation OP2 of the display device 112. In the first state, the first common line CI1 is in the selected state of the sense operation. In other words, the first common line CI1 corresponds to a selected block. FIG. 10 is the same as FIG. 9. In the first state, the operation described in regard to FIG. 9 is performed.

Figure 11:
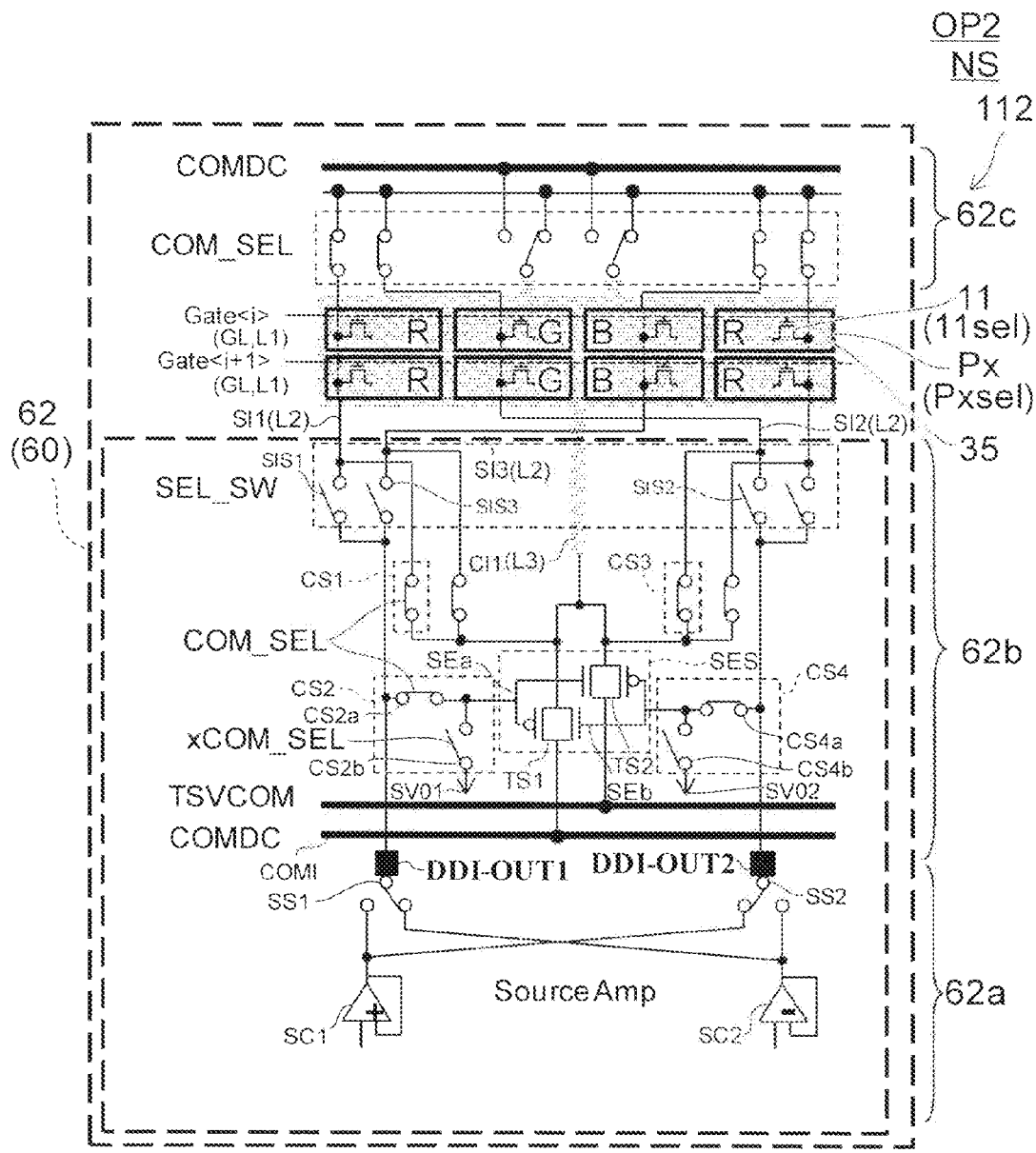
FIG. 11 is a schematic view illustrating another operation of the display device according to the second embodiment.

FIG. 11 is a schematic view illustrating another operation of the display device according to the second embodiment.

FIG. 11 shows a second state of the second operation OP2 of the display device 112. In the second state, the first common line CI1 is in an unselected state of the sense operation. In other words, the first common line CI1 corresponds to an unselected block. The second state is a state that is different from the first state.

The following are implemented in the second state.

The first source circuit SC1 outputs the first voltage. The second source circuit SC2 outputs the second voltage that is lower than the first voltage.

One end of the first source switch SS1 is electrically connected to the second source circuit SC2.

One end of the second source switch SS2 is electrically connected to the first source circuit SC1.

Otherwise, the operation described in regard to FIG. 9 is implemented.

In the display device 112 as well, the following operations are implementable.

In the first operation OP1, the selector switch SEL_SW electrically connects the source circuit (e.g., the first source circuit SC1) to each of the multiple second lines L2. The common selector COM_SEL electrically connects the display counter potential line COMI to each of the multiple third lines L3. In this state, the desired display is performed by supplying the image signal to the multiple second lines L2 by sequentially operating the multiple first lines L1.

On the other hand, in the second operation OP2, the selector switch SEL_SW electrically disconnects the source circuit from each of the multiple second lines L2. The common selector COM_SEL electrically connects at least one of the multiple third lines L3 to at least one of the multiple second lines L2. In this state, for example, the sensing is performed using the third lines L3 and the fourth lines L4. For example, a measurement of the noise may be performed.

In the display device 112 according to the embodiment as well, the third lines L3 extend to be aligned with the second lines L2. In the second operation OP2, the potentials of the third lines L3 are set to be substantially the same as the potentials of the second lines L2. Therefore, a capacitance substantially is not formed between the third lines L3 and the second lines L2. Or, the capacitance can be small. For example, in the second operation OP2, the load of the third lines L3 decreases drastically. For example, in the second operation OP2, the load of the third lines L3 decreases drastically. For example, in the case where the sensing of the touch input is performed in the second operation OP2, the sense interval can be shortened; and the power consumption when sensing can be reduced. The sense interval using the third lines L3 and the fourth lines L4 can have a higher operation speed. The load of the third lines L3 decreases. The driving recited above can be realized by a small drive IC. The width of the frame around the display unit can be reduced. For example, the display device can be downsized.

Compared to the display device 111, the first sense potential switch SVS1 and the sense potential line are omitted from the display device 112. Thereby, the IC (the first circuit unit 62a) of the source amplifier can be downsized. The cost can be reduced. On the other hand, compared to the display device 112, the configuration of the second circuit unit 62b is simple in the display device 111. Thereby, for example, the size of the first substrate 10 can be small.

Also, because the common line CL that is driven can be selected using the source amplifier, a driver circuit can be omitted; and any driving such as partial scanning, thinned scanning, etc., is possible.

For example, in the touch operation of the embodiment, the output of the first circuit unit 62a is used only to control the switches; and the touch sensing pulse signal is supplied from lines inside the second circuit unit 62b. Therefore, a signal that has an amplitude exceeding the breakdown voltage of the drive IC can be supplied to the third lines L3. In other words, the sense signal line TSVCOM may oscillate with a high (large) amplitude. As a result, it is possible to improve the signal for the touch operation. For example, in the display device 111, the voltage of the signal supplied to the third line L3 (i.e., the signal supplied to the sense signal line TSVCOM) is limited to the breakdown voltage of the drive IC. For example, in the case where the breakdown voltage of the drive IC is about ±6 V, the voltage (the amplitude) of the sense signal line TSVCOM can be set to be about 10 V.

Figure 12:
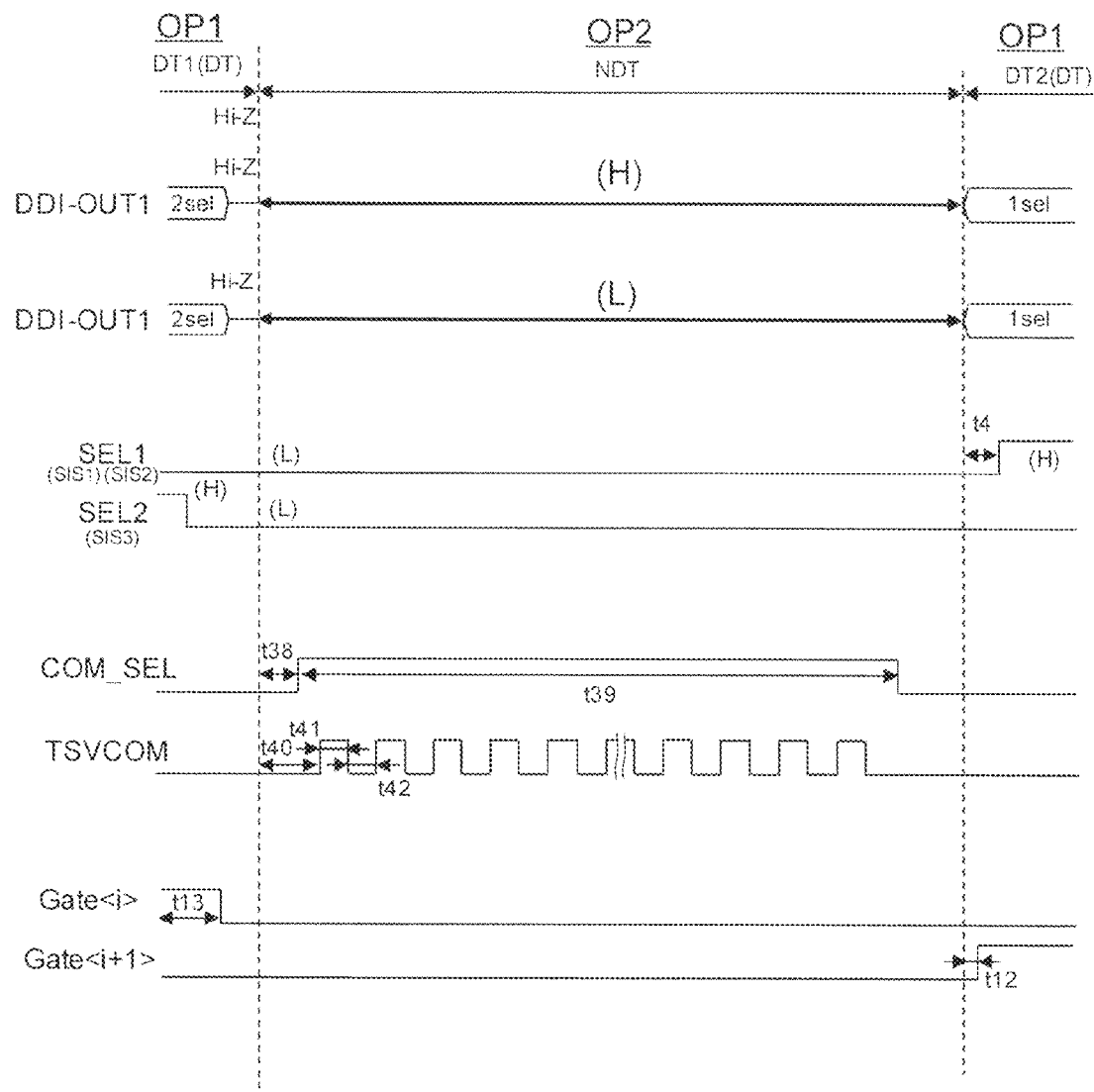
FIG. 12 is a schematic view illustrating an operation of the display device according to the second embodiment.

FIG. 12 is a schematic view illustrating an operation of the display device according to the second embodiment.

FIG. 12 shows the timing chart of the second operation OP2 of the display device 112.

In the second operation OP2 (the non-display interval NDT) as illustrated in FIG. 12, for example, the other end (the first signal output DDI-OUT1) of the first source switch SS1 is in the high-level state "H;" and the other end (the second signal output DDI-OUT2) of the second source switch SS2 is in the low-level state "L." The signal SEL1 is in the low state L; and the signal SEL2 is in the high state H. The common selector COM_SEL is in the high state H for a time t39. The sense signal of the sense signal line TSV-COM includes a signal in which the high potential and the low potential repeat. Thereby, the operation recited above is performed.

Third Embodiment

Figure 13:
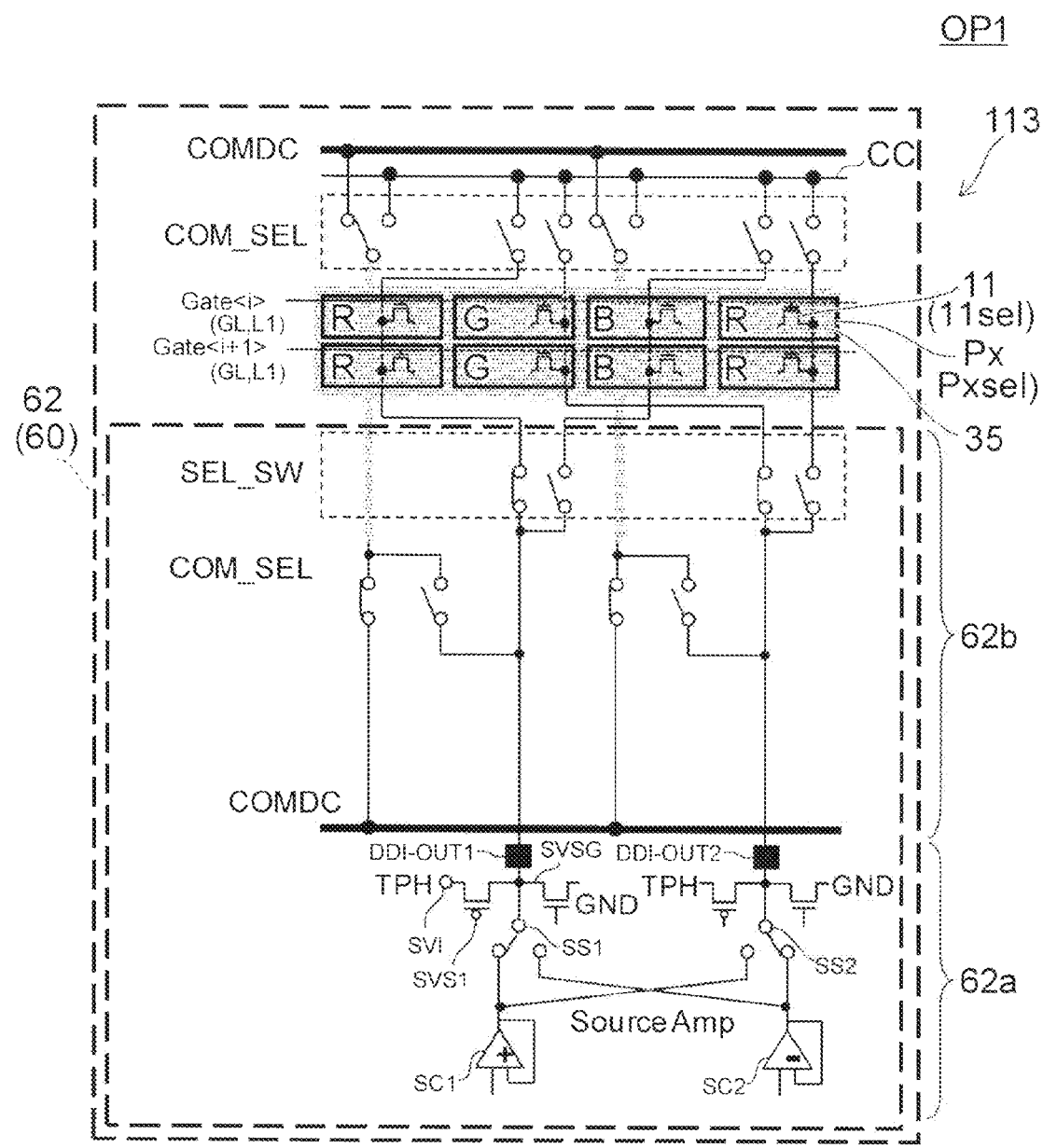
FIG. 13 is a schematic view illustrating a display device according to a third embodiment.

FIG. 13 is a schematic view illustrating a display device according to a third embodiment.

FIG. 13 shows a portion of the display device 113. The configuration described in regard to the display device 110 is applied to the portions other than that illustrated in FIG. 13.

As illustrated in FIG. 13, a ground potential switch SVSG is provided in the example. One end of the ground potential switch SVSG is connected to the other end of the first sense potential switch SVS1. For example, the other end of the ground potential switch SVSG is connected to the ground potential GND.

The ground potential GND is connected to the sense potential line SVl of the potential (the touch operation potential TPH) that is different from the ground potential GND and is connected to the control circuit similarly to the common selector COM_SEL2 described in regard to FIG. 4. Thereby, the touch sensing pulse signal is generated. FIG. 13 shows the first operation OP1 of the display device 113.

Figure 14:
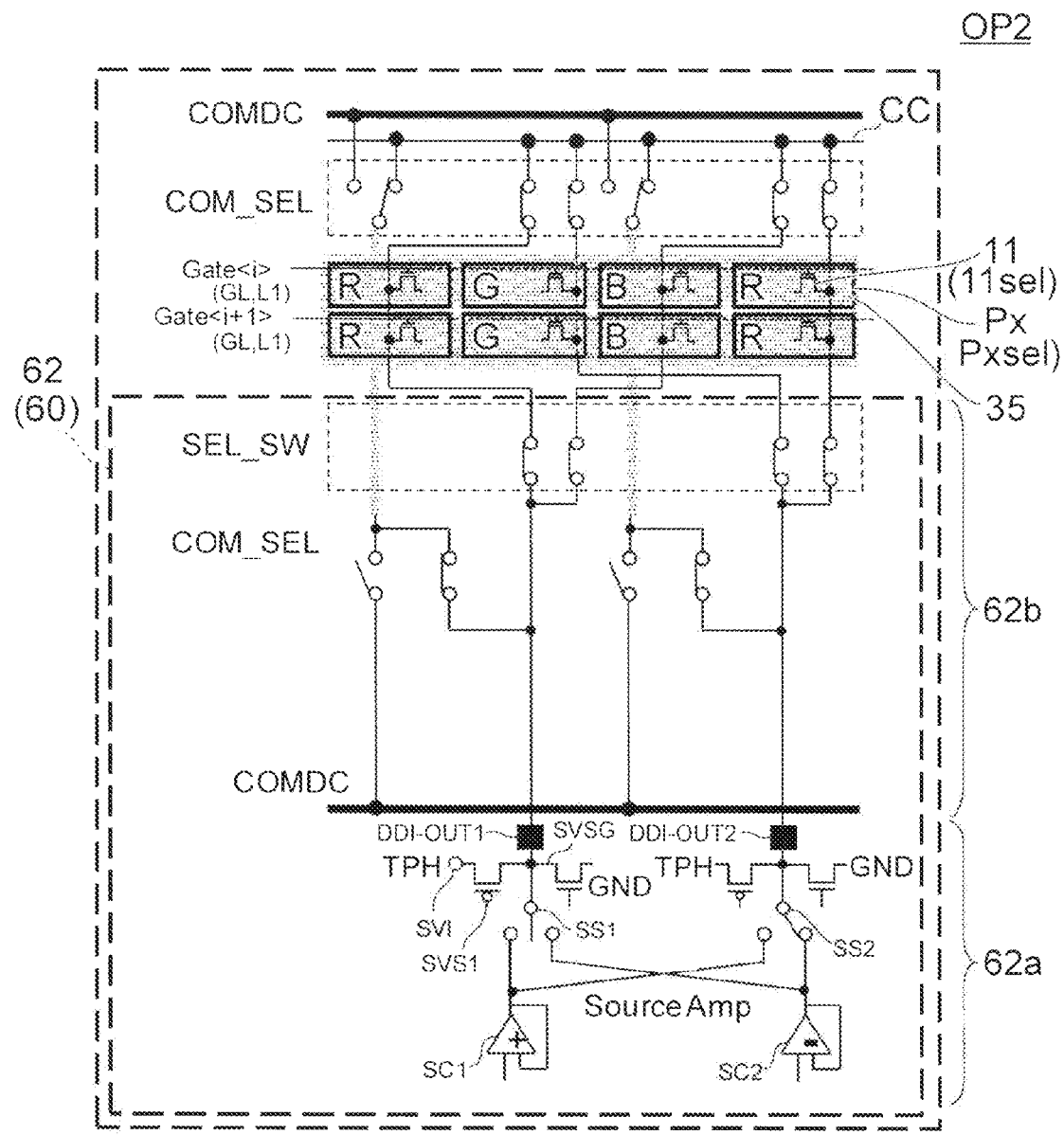
FIG. 14 is a schematic view illustrating the display device according to the third embodiment.

FIG. 14 is a schematic view illustrating the display device according to the third embodiment.

FIG. 14 shows the second operation OP2 of the display device 114.

In the display device 113 as well, operations similar to the operations described in regard to the display devices 111 and 112 are implementable.

In the display device 113 as well, the third lines L3 are aligned with the second lines L2. Thereby, the capacitance can be small; the sense interval can be shortened; and the power consumption when sensing can be reduced. A small drive IC can be used. Because the touch sensing pulse signal is generated inside the first circuit unit 62a, the width of the frame around the display unit can be reduced. Because the third lines L3 that are driven are selected using the first circuit unit 62a, thinned scanning and partial scanning are possible.

The first to third embodiments may be implemented as the method for driving the display device.

Fourth Embodiment

Figure 15:
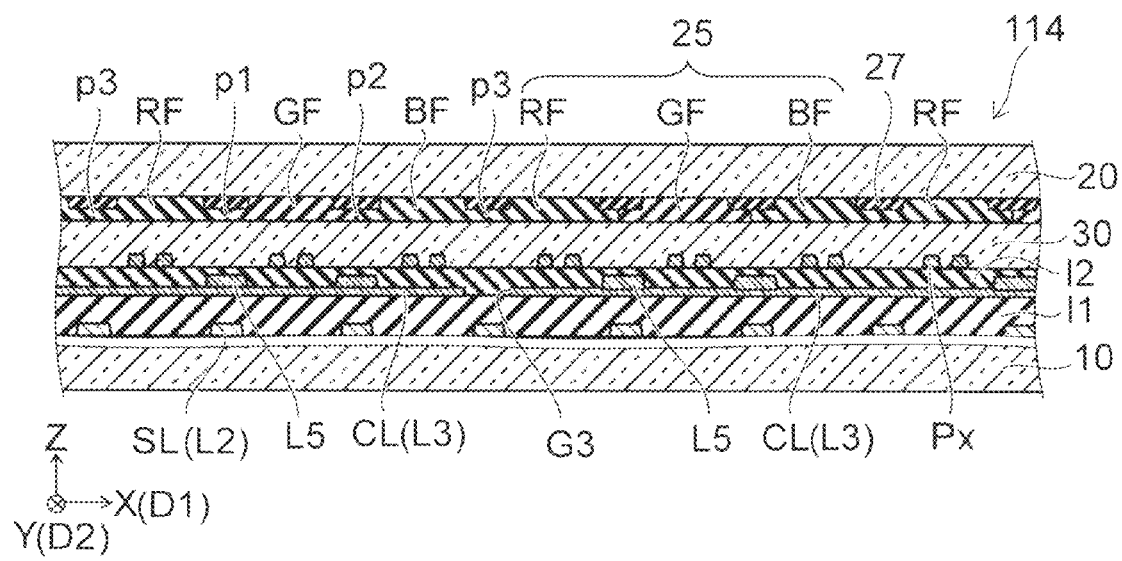
FIG. 15 is a schematic cross-sectional view illustrating a portion of a display device according to a fourth embodiment.

FIG. 15 is a schematic cross-sectional view illustrating a portion of a display device according to a fourth embodiment.

As illustrated in FIG. 15, the color filter layer 25 and multiple fifth lines L5 are further provided in the display device 114 according to the embodiment. Otherwise, the configurations described in regard to the display devices 110 to 113 are applicable.

The color filter layer 25 includes a red filter layer RF, a green filter layer GF, and a blue filter layer BF.

The color filter layer 25 includes a first boundary portion p1, a second boundary portion p2, and a third boundary portion p3. The first boundary portion p1 is the boundary portion between the red filter layer RF and the green filter layer GF. The second boundary portion p2 is the boundary portion between the green filter layer GF and the blue filter layer BF.

The third boundary portion p3 is the boundary portion between the blue filter layer BF and the red filter layer RF.

The multiple fifth lines L5 extend in the second direction D2 (e.g., the Y-axis direction). Each of the multiple fifth lines L5 is electrically connected to one of the multiple third lines L3. The electrical resistance of each of the multiple fifth lines L5 is lower than the electrical resistance of each of the multiple third lines L3. The fifth lines L5 are used as supplemental lines of the third lines L3.

As described above, a light-transmissive conductive material is used as the third line L3. On the other hand, the fifth line L5 includes a material (a metal, etc.) having a low resistance. Thereby, the effective resistance of the third line L3 can be reduced. The occurrence of crosstalk can be suppressed. For example, the performance of the touch operation can be improved; and the display performance improves.

In the example, the multiple fifth lines L5 overlap the first boundary portion p1 or the second boundary portion p2 when projected onto the X-Y plane. The fifth lines L5 may not overlap the third boundary portion p3.

As illustrated in FIG. 15, a light-shielding layer 27 (e.g., a black matrix) may be further provided. The light-shielding layer 27 includes portions overlapping the first boundary portion p1, the second boundary portion p2, and the third boundary portion p3 when projected onto the X-Y plane. Thereby, the light leakage can be suppressed further; and a higher-quality display is obtained.

The light-shielding layer 27 includes chrome, a chromic compound, etc. A black resin may be used as the light-shielding layer 27. A stacked film in which at least two of the red filter layer RF, the green filter layer GF, or the blue filter layer BF are stacked may be used as the light-shielding layer 27.

The configurations and operations described in regard to the first to third embodiments may be combined with those of the fourth embodiment.

According to the embodiments, a high-quality display device can be provided.

In the specification of the application, "perpendicular" and "parallel" include not only strictly perpendicular and strictly parallel but also, for example, the fluctuation due to manufacturing processes, etc.; and it is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the display device such as the line, the switch element, the display layer, the insulating layer, the controller, the switch, the selector, the circuit, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

Those skilled in the art can suitably modify the above embodiments by addition, deletion, or design change of components, or by addition, omission, or condition change of processes, and such modifications are also encompassed within the scope of the invention as long as they fall within the spirit of the invention.

Other operations produced from aspects described in the embodiment, the operations being clear from the specification and appropriately obtainable by a person skilled in the art, are considered to be naturally produced from the invention.

What is claimed is:

1. A display device, comprising:
a plurality of first lines extending in a first direction to be arranged in a second direction intersecting the first direction;
a plurality of second lines extending in the second direction to be arranged in the first direction;
a plurality of switch elements, each of the plurality of switch elements being electrically connected to one of the plurality of first lines and one of the plurality of second lines;
a plurality of pixel electrodes electrically connected respectively to the plurality of switch elements;
a plurality of third lines extending in the second direction to be arranged in the first direction;
a display layer performing an optical operation of at least one of a light emission or a change of an optical characteristic based on an electrical signal applied to the plurality of pixel electrodes;
a plurality of fourth lines forming a capacitance between the third lines and the fourth lines;
a controller including at least one switch connected between the second lines and the third lines,
the controller applying a touch sensing pulse signal to the third lines and sensing a contact or a proximity of an object based on an output of the fourth lines,
wherein
in a display interval, the controller implements a first operation of supplying an image signal to the plurality of second lines while setting one of the plurality of first lines to a select potential, setting a selection pixel electrode of the plurality of pixel electrodes electrically connected to a selection switch element of the plurality of switch elements to an image potential based on the image signal via the selection switch element, and setting one of the plurality of third lines to a display counter potential, the selection switch element being electrically connected to the first line set to the select potential, and
in a non-display interval, the controller implements a second operation of setting a potential of at least one of the plurality of second lines to be the same as a potential of one of the plurality of third lines,
the plurality of second lines includes a first signal line,
the plurality of third lines includes a first common line,
the controller includes:
a display counter potential line set to the display counter potential;
a sense potential line set to a potential different from the display counter potential;
a first sense potential switch having one end electrically connected to the sense potential line;
a first signal line switch having one end electrically connected to the first signal line and one other end electrically connected to one other end of the first sense potential switch;
a first common selector having one end electrically connected to the first signal line and one other end electrically connected to the first common line; and
a second common selector having one end electrically connected to the first common line and the one other end of the first common selector, the second common selector electrically connecting the first common line to one of the display counter potential line or the one other end of the first sense potential switch, and the second operation includes:
- the first sense potential switch electrically connecting the sense potential line to the second common selector;
- the first common selector electrically connecting the first signal line to the first common line; and
- the second common selector electrically connecting the first common line to one of the display counter potential line or the one other end of the first sense potential switch alternately and repeatedly.

2. The device according to claim 1, wherein
the second operation includes
- the first signal line switch electrically disconnecting the first signal line from the one other end of the first sense potential switch.

3. The device according to claim 2, wherein
the controller further includes:
- a first source circuit capable of outputting a signal of a portion of the image signal; and
- a first source switch having one end electrically connectable to the first source circuit and one other end electrically connected to the one other end of the first sense potential switch, and the first operation includes:
- the first sense potential switch electrically disconnecting the sense potential line from the second common selector;
- the first source circuit outputting the signal of the portion of the image signal;
- the first source switch electrically connecting the first source circuit to the one other end of the first signal line switch;
- the first signal line switch electrically connecting the one other end of the first source switch to the first signal line;
- the first common selector electrically disconnecting the one other end of the first signal line from the second common selector; and
- the second common selector electrically connecting the first common line to the display counter potential line.

4. The device according to claim 3, wherein
in the second operation, the first source switch electrically disconnects the first source circuit from the one other end of the first signal line switch.

5. The device according to claim 2, wherein
the plurality of second lines further includes a second signal line,
the controller includes:
- a second signal line switch having one end electrically connected to the second signal line;
- a third common selector having one end electrically connected to the second signal line and one other end electrically connected to the first common line; and
- a fourth common selector having one end electrically connected to the first common line and the one other end of the third common selector, the fourth common selector electrically connecting the first common line to one of the display counter potential line or the one other end of the first sense potential switch, and the second operation includes:
- the third common selector electrically connecting the second signal line to the first common line; and
- the fourth common selector electrically connecting the first common line to one of the display counter potential line or the one other end of the first sense potential switch alternately and repeatedly.

6. The device according to claim 5, wherein
the controller further includes:
- a second source circuit capable of outputting a signal different from the signal of the portion of the image signal; and
- a second source switch having one end electrically connectable to the second source circuit and one other end electrically connected to the one other end of the second signal line switch, and the first operation includes:
- the second source circuit outputting the different signal;
- the second source switch electrically connecting the second source circuit to the one other end of the second signal line switch;
- the second signal line switch electrically connecting the one other end of the second source switch to the second signal line;
- the third common selector electrically disconnecting the second signal line from the fourth common selector; and
- the fourth common selector electrically connecting the first common line to the display counter potential line.

7. The device according to claim 6, wherein
in the second operation, the second source switch electrically disconnects the second source circuit from the one other end of the second signal line switch.

8. The device according to claim 2, wherein
the plurality of second lines further includes a third signal line,
the controller further includes:
- a third signal line switch having one end electrically connected to the third signal line and one other end electrically connected to the one other end of the first sense potential switch; and
- a fifth common selector having one end electrically connected to the third signal line and one other end electrically connected to the first common line, and the second operation includes:
- the third signal line switch electrically disconnecting the third signal line from the one other end of the first sense potential switch; and
- the fifth common selector electrically connecting the third signal line to the first common line.

9. The device according to claim 8, wherein
the first operation includes:
- the third signal line switch electrically disconnecting the one other end of the first source switch from the third signal line; and
- the fifth common selector electrically disconnecting the one other end of the third signal line from the second common selector.

10. The device according to claim 9, wherein
in the second operation, the first source switch electrically disconnects the first source circuit from the one other end of the third signal line switch.

11. The device according to claim 1, further comprising:
a color filter layer including a red filter layer, a green filter layer, and a blue filter layer; and
a plurality of fifth lines extending in the second direction,
the color filter layer including a first boundary portion between the red filter layer and the green filter layer, a second boundary portion between the green filter layer and the blue filter layer, and a third boundary portion between the blue filter layer and the red filter layer, each of the plurality of fifth lines being electrically connected to one of the plurality of third lines, electrical resistances of each of the plurality of fifth lines being lower than electrical resistances of each of the plurality of third lines, the plurality of fifth lines overlapping the first boundary portion or the second boundary portion but not overlapping the third boundary portion when projected onto a plane including the first direction and the second direction.

12. The device according to claim 1, further comprising a color filter layer including a red filter layer, a green filter layer, and a blue filter layer, the color filter layer including a first boundary portion between the red filter layer and the green filter layer, a second boundary portion between the green filter layer and the blue filter layer, and a third boundary portion between the blue filter layer and the red filter layer, at least one gap between the plurality of third lines overlapping the third boundary portion when projected onto a plane including the first direction and the second direction.

13. The device according to claim 1, wherein the controller further includes a display drive integrated circuit including a source circuit, and the controller applies the touch sensing pulse signal to the third lines using an output of the display drive integrated circuit.

14. The device according to claim 13, wherein in the second operation, the display drive integrated circuit selects the third line to be scanned when touch sensing from the plurality of third lines.

* * * * *